United States Patent
Ooba

(10) Patent No.: US 8,542,199 B2
(45) Date of Patent: Sep. 24, 2013

(54) IMAGE PROCESSING APPARATUS, IMAGE PROCESSING METHOD, AND PROGRAM

(75) Inventor: Osamu Ooba, Tokyo (JP)

(73) Assignee: Sony Corporation, Tokyo (JP)

( * ) Notice: Subject to any disclaimer, the term of this patent is extended or adjusted under 35 U.S.C. 154(b) by 1009 days.

(21) Appl. No.: 12/582,321

(22) Filed: Oct. 20, 2009

(65) Prior Publication Data

US 2010/0097339 A1    Apr. 22, 2010

(30) Foreign Application Priority Data

Oct. 21, 2008 (JP) .............................. P2008-271087

(51) Int. Cl.
*G06F 3/041* (2006.01)

(52) U.S. Cl.
USPC ........................................................ 345/173

(58) Field of Classification Search
USPC ................................................. 345/156–184
See application file for complete search history.

(56) References Cited

U.S. PATENT DOCUMENTS

| | | | |
|---|---|---|---|
| 5,953,008 A | 9/1999 | Hagiuda | |
| 6,344,907 B1 | 2/2002 | Watanabe et al. | |
| 6,943,778 B1 | 9/2005 | Astala et al. | |
| 7,489,305 B2 * | 2/2009 | Salisbury et al. | 345/173 |
| 8,124,766 B2 * | 2/2012 | Bolin et al. | 544/364 |
| 2003/0133032 A1 | 7/2003 | Aoki et al. | |
| 2008/0170044 A1 | 7/2008 | Kanada | |
| 2009/0204895 A1 * | 8/2009 | Bhatt et al. | 715/273 |
| 2009/0319897 A1 * | 12/2009 | Kotler et al. | 715/711 |

FOREIGN PATENT DOCUMENTS

JP    5-241506    9/1993

OTHER PUBLICATIONS

Supplementary European Search Report issued Aug. 29, 2011, in corresponding EP 09 25 2348.
Sony Vegas Movie Studio Quick Start Manual, http://teacherlink.ed.usu.edu/tlresources/training2/vegasvideo6/VegasMovieStudio90_gsg.pdf, 74 pages (revised 2008).
European Search Report issued Sep. 7, 2011, in corresponding EP 09 25 2348.

* cited by examiner

*Primary Examiner* — Rodney Amadiz
(74) *Attorney, Agent, or Firm* — Finnegan, Henderson, Farabow, Garrett & Dunner, LLP

(57) ABSTRACT

The image processing apparatus according to the present invention is provided with an image processing unit for performing the image processing function by changing its execution parameter for the image processing function, which is associated with a processing result display area for displaying an image processing result acquired from applying a predetermined image processing function to specified image data, based on at least one of a surface area size of an operator contacting the processing result display area or contact duration in which the operator contacts the processing result display area.

6 Claims, 16 Drawing Sheets

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program.

2. Description of the Related Art

Recently, a variety of image processing functions have been performed by commercially available image processing applications, as information processing technology advances. In an image processing function performed by a commercially available image processing application known in the art, the image processing function is performed by selecting a process target image and then selecting the image processing function applied to the selected image from a menu bar or icons displayed on a screen.

While performing image processing function in this manner, however, there are two issues as follow. A first issue is that it is difficult for a user to recognize names of image processing functions that can be performed by an image processing application. In a commercially available image processing application or a tool attached to a mobile telephone and so on, what is presented to the user is just a name of an image processing function. Thus, the user may be required to recognize contents of the image processing function by referring to its name.

A second issue is that a user may be required to recognize a position of a menu bar or each of icons in an image processing application. In commercially available image processing applications, the user may be required not only to recognize a name of an image processing function, but also to open the menu bar and search for a target processing function from the menu bar or to select an object, such as an icon. To this end, the user encounters with an issue that requires the user to recognize where the menu bar or the icon is located on a screen. Furthermore, before applying another image processing function, the user may be required to select the image processing function from the menu bar or the icons again, thereby causing the user's attention to drift a long way. Accordingly, the user feels that image processing is a troublesome and difficult task to execute.

In Japanese Patent Application Laid-Open No. 2000-67219, an image processing method is disclosed in which a filter is selected based on a user's operation and an image processing function corresponding to the selected filter is applied to image data in order to improve operationality in image processing.

SUMMARY OF THE INVENTION

However, some image processing functions require parameters, which set respective image processing functions' execution levels, to be input, when the image processing functions are executed. This causes a user to recognize the meaning of the parameter in each of the image processing functions. Therefore, there is an issue that convenience for the user is impaired.

According to the above-mentioned issues, there is a need for novel and improved image processing apparatus, image processing method, and program, in which a parameter required for an image processing function can be easily set without impairing convenience for a user.

According to an embodiment of the present invention, there is provided an image processing apparatus including a display screen having processing result display areas in which an image processing result acquired by performing a predetermined image processing function on a specified image data is displayed, a surface area detection unit for detecting an operator located on the display screen and detecting a surface area corresponding to the operator on the display screen, a contact detection unit for detecting one or more of the processing result display areas in contact with the surface area detected by the surface area detection unit, an image processing unit for performing an image processing function by changing an execution parameter for the image processing function related to the processing result display area detected by the contact detection unit depending on at least one of a size of the surface area in contact with the detected processing result display area and a length of contact duration in which the operator contacts the detected processing result display area.

According to this configuration, the display screen has the processing result display areas in which the image processing result acquired by performing the predetermined image processing function on the specified image data is displayed. In addition, the surface area detection unit detects the operator located on the display screen and detects the surface area corresponding to the operator on the display screen. In addition, the contact detection unit detects one or more of the processing result display areas in contact with the surface area detected by the surface area detection unit. In addition, the image processing unit performs the image processing function by changing the execution parameter for the image processing function related to the processing result display area detected by the contact detection unit depending on at least one of the size of the surface area in contact with the processing result display area and the length of the contact duration in which the operator contacts the processing result display area.

Execution examples acquired by performing an image processing function related to the processing result display area may have previously been displayed as exemplary images in the processing result display areas, and the image processing unit may preferably perform an image processing function related to a processing result display area on the image data that has been moved to a predetermined area by the operator.

The image processing unit may change and display the exemplary images that have been acquired by applying the image processing function using the execution parameter with different values being set at a predetermined time interval.

The image processing unit may perform an image processing function on the image data that has been overlapped with the exemplary images by the operator.

The processing result display area may have a predetermined shape, and the image processing unit may change a shape of the image data that has been overlapped with the processing result display area by the operator into the shape of the processing result display area.

According to another embodiment of the present invention, there is provided an image processing method including the steps of detecting an operator located on a display screen having processing result display areas in which an image processing result acquired by performing a predetermined image processing function on a specified image data is displayed, and detecting a surface area corresponding to the operator on the display screen, detecting one or more of the processing result display areas in contact with the detected surface area, and performing an image processing function by changing an execution parameter for the image processing function related to the detected processing result display area depending on at least one of a size of the surface area in contact with the detected processing result display area and a length of contact duration in which the operator contacts the detected processing result display area.

According to another embodiment of the present invention, there is provided a program for causing a computer including a display screen having processing result display areas in which an image processing result acquired by performing a predetermined image processing function on a specified image data is displayed to execute a surface area detection process for detecting an operator located on the display screen and detecting a surface area corresponding to the operator on the display screen, a contact detection process for detecting one or more of the processing result display areas in contact with the surface area detected by the surface area detection process, and an image processing process for performing an image processing function by changing an execution parameter for the image processing function related to the processing result display area detected by the contact detection process depending on at least one of a size of the surface area in contact with the detected processing result display area and a length of contact duration in which the operator contacts the detected processing result display area.

According to this configuration, a computer program is stored in a storage unit included in a computer, and read and executed by CPU included in the computer so that the computer program causes the computer to operate as the above-mentioned image processing apparatus. In addition, there is also provided a computer readable recording medium in which the computer program is recorded. The recording medium may be, for example, a magnetic disk, an optical disk, a magnetic optical disk, a flash memory, and so on. Furthermore, the above-mentioned computer program may be distributed via a network without using a recording medium.

According to another embodiment of the present invention, there is provided an image processing apparatus including a display screen on which processing result display areas for displaying an image processing result acquired by performing a predetermined image processing function as an explanatory image and images to which an image processing function can be applied are displayed, a surface area detection unit for detecting an operator located on the display screen and detecting a surface area corresponding to the operator on the display screen, a contact detection unit for detecting a contact object including one or more of the images and the processing result display areas in contact with the surface area detected by the surface area detection unit, an overlapping area detection unit for detecting an overlapping area between the image and the processing result display area when the image in contact with the surface area overlaps with at least a part of the processing result display area by an operation of the operator, and an image processing unit for performing an image processing function related to the processing result display area on the overlapping area between the image and the processing result display area.

According to this configuration, on the display screen, processing result display areas for displaying an image processing result acquired by performing a predetermined image processing function as an exemplary image and images to which an image processing function can be applied are displayed. In addition, the surface area detection unit detects an operator located on the display screen and detects a surface area corresponding to the operator on the display screen. In addition, the contact detection unit detects a contact object including one or more of the images and the processing result display areas in contact with the surface area detected by the surface area detection unit. In addition, the overlapping area detection unit detects an overlapping area between an image and a processing result display area when the image in contact with the surface area overlaps with at least a part of the processing result display area by an operation of the operator. Furthermore, the image processing unit performs an image processing function related to the processing result display area on the overlapping area between the image and the processing result display area.

According to another embodiment of the present invention, there is provided an image processing method including the steps of detecting an operator located on a display screen on which processing result display areas for displaying an image processing result acquired by performing a predetermined image processing function as an explanatory image and images to which an image processing function can be applied are displayed, and detecting a surface area corresponding to the operator on the display screen, detecting a contact object including one or more of the images and the processing result display areas in contact with the detected surface area, detecting an overlapping area between the image and the processing result display area when the image in contact with the surface area overlaps with at least a part of the processing result display area by an operation of the operator, and performing an image processing function related to the processing result display area on the overlapping area between the image and the processing result display area.

According to another embodiment of the present invention, there is provided a program for causing a computer having a display screen on which processing result display areas for displaying an image processing result acquired by performing a predetermined image processing function as an explanatory image and images to which an image processing function can be applied are displayed to execute a surface area detection process for detecting an operator located on the display screen and detecting a surface area corresponding to the operator on the display screen, a contact detection process for detecting a contact object including one or more of the images and the processing result display areas in contact with the surface area detected by the surface area detection process, an overlapping area detection process for detecting an overlapping area between the image and the processing result display area when the image in contact with the surface area overlaps with at least a part of the processing result display area by an operation of the operator, and an image processing process for performing an image processing function related to the processing result display area on the overlapping area between the image and the processing result display area.

According to this configuration, a computer program is stored in a storage unit included in a computer, and read and executed by CPU included in the computer so that the computer program causes the computer to operate as the above-mentioned image processing apparatus. In addition, there is also provided a computer readable recording medium in which the computer program is recorded. The recording medium may be, for example, a magnetic disk, an optical disk, a magnetic optical disk, a flash memory, and so on. Furthermore, the above-mentioned computer program may be distributed via a network without using a recording medium.

According to the present invention, a parameter required for an image processing function can be easily set without impairing convenience for a user.

DESCRIPTION OF THE PREFERRED EMBODIMENTS

Figure 1:
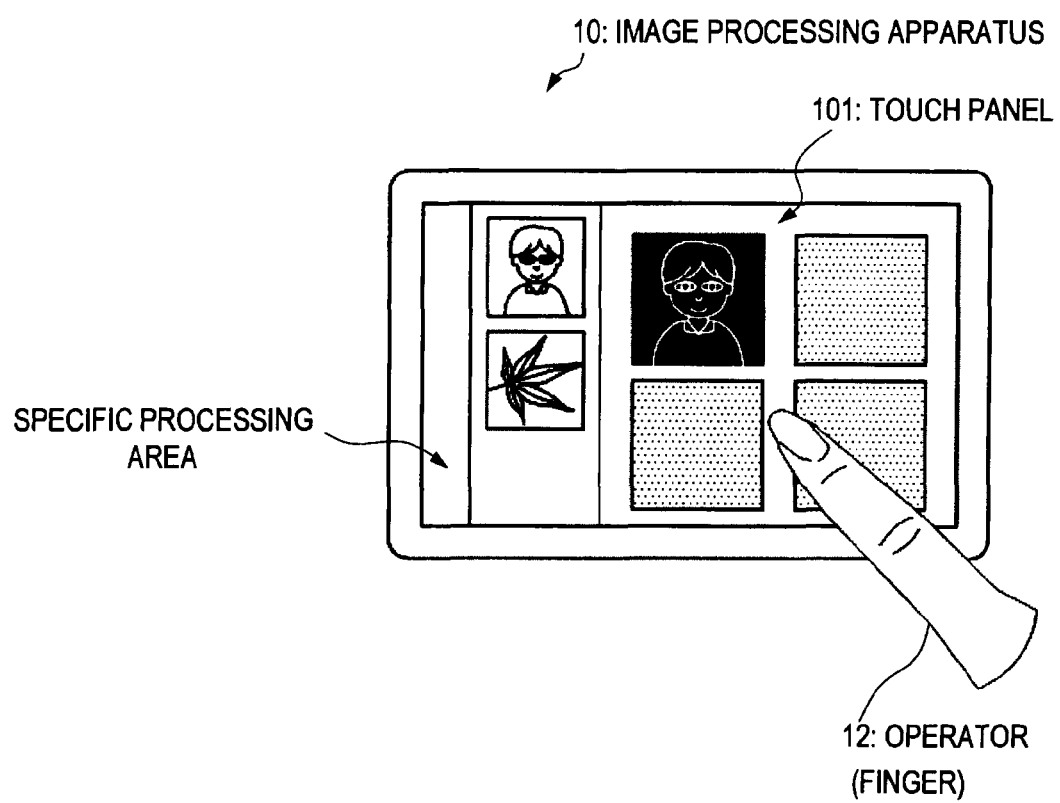
FIG. 1 is an explanatory diagram illustrating an example of an appearance of an image processing apparatus according to a first embodiment of the present invention.

Hereinafter, preferred embodiments of the present invention will be described in detail with reference to the accompanying drawings. Note that, in this specification and the appended drawings, structural elements that have substantially the same functional structure are denoted with the same reference numerals, and repeated description of these structural elements is omitted.

A detailed description will be given in the following order:
(1) First Embodiment
 (1-1) General Structure of Image Processing Apparatus
 (1-2) Functional Structure of Image Processing Apparatus
 (1-3) Example of Display Screen
 (1-4) Image Processing Method
(2) Second Embodiment
 (2-1) Functional Structure of Image Processing Apparatus
 (2-2) Image Processing Method
(3) Hardware Structure of Image Processing Apparatus According to Each of Embodiments of the Present Invention
(4) Summary

First Embodiment

General Structure of Image Processing Apparatus

Referring to FIG. 1, a general structure of an image processing apparatus according to a first embodiment of the present invention will be described. FIG. 1 is an explanatory diagram illustrating an appearance of an image processing apparatus 10 according to this embodiment.

As shown in FIG. 1, the image processing apparatus 10 is provided with a display unit with a touch panel 101 (hereinafter, simply called as "touch panel 101"). On the touch panel 101, various types of information, such as a thumbnail image of image data, to which an image processing function can be applied, are displayed, as shown in FIG. 1. The various types of the information displayed on the touch panel 101 are subject to a predetermined processing function, such as scrolling, in response to contact with or movement of an operator 12. The touch panel 101 may also be provided with a specific processing area. In the specific processing area, an object, such as an icon, used for performing the predetermined processing function, for example, is displayed and the predetermined processing function related to the displayed object is performed with the specific processing area being selected.

The image processing apparatus 10 does not necessarily performs particular processing functions, such as selection of an object and movement of displayed contents, on the contact with or the movement of the operator 12. For example, when the operator 12 has moved along a predetermined trajectory while in contact with the touch panel 101, the image processing apparatus 10 performs a predetermined processing function corresponding to the trajectory, which the operator 12 has followed. This means that the image processing apparatus 10 has gesture input feature. For example, when a predetermined gesture is input to the image processing apparatus 10, an application related to the predetermined gesture may be invoked or a predetermined processing function related to the predetermined gesture may be performed.

The operator 12 may be embodied, for example, by a finger of a user. The operator 12 may also be embodied, for example, by a stylus or a touch pen. In addition, when the touch panel 101 is an optical touch panel, any objects may be used as the operator 12. For example, when the touch panel 101 is the optical touch panel, then a soft tool, such as a brush, with which the touch panel 101 is difficult to press, may be used as the operator 12. Furthermore, when the touch panel 101 is an In-Cell optical touch panel, any objects that can be reflected on the touch panel 101 may be used as the operator 12.

An In-Cell optical touch panel will now be briefly explained. There are several types of optical touch panels. For example, a kind of an optical touch panel is relatively well known in the art, in which an optical sensor is provided at an outer frame of a liquid crystal panel forming a liquid crystal display and a position and/or a moving direction of the operator 12 in contact with the liquid crystal panel is detected by the optical sensor. In contrast to this optical touch panel, the In-Cell optical touch panel has an optical sensor array mounted on a liquid crystal panel and has a mechanism to detect a position and/or a moving direction of the operator 12 in contact with or in proximity to the liquid crystal panel by the optical sensor array.

In more detail, the In-Cell optical touch panel has an optical sensor and a read circuit formed on a glass substrate, and a light incident from an outside of the touch panel is detected by the optical sensor and an intensity of the detected light is read out by the read circuit to perceive a shade of the operator 12. In this manner, the In-Cell optical touch panel can perceives a shape and a contact area of the operator 12, and so on based on the shade of the operator 12. For this reason, the In-Cell optical touch panel can achieve an operation by a contact "surface", which would otherwise be difficult to achieve by other types of optical touch panels. In addition, by utilizing the In-Cell optical touch panel, advantages, such as improvement of accuracy of perception, improvement of display quality, and improvement of design quality in a liquid crystal display or the like equipped with the In-Cell optical touch panel, can be achieved.

Figure 2:
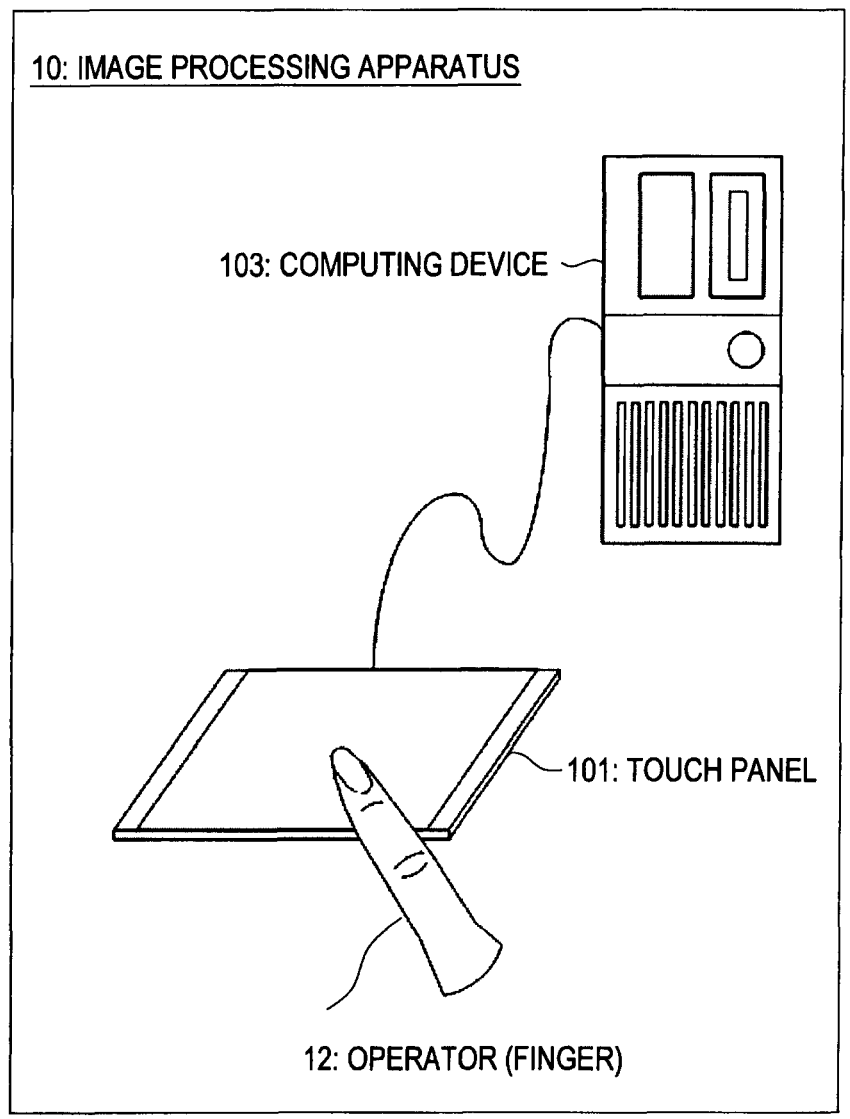
FIG. 2 is an explanatory diagram illustrating an example of an appearance of the image processing apparatus according to the first embodiment.

A structure of the image processing apparatus 10 equipped with the touch panel 101 may be modified, for example, as shown in FIG. 2. In an example shown in FIG. 2, the touch panel 101 and a computing device 103 for processing positional information or the like of the operator 12 detected by the touch panel 101, which are included in the image processing apparatus 10, are separately formed. In this exemplary structure, data processing that occurs in response to selection of an object and/or movement of displayed contents is performed by the computing device 103. In this manner, the image processing apparatus 10 can freely modify its structure depending on embodiments.

Furthermore, features of the image processing apparatus 10 are, for example, implemented by a personal digital assistant, mobile telephone, a portable game machine, a portable music player, a broadcast equipment, a personal computer, a car navigation system, an information appliance or the like.

<Functional Structure of Image Processing Apparatus>

Figure 3:
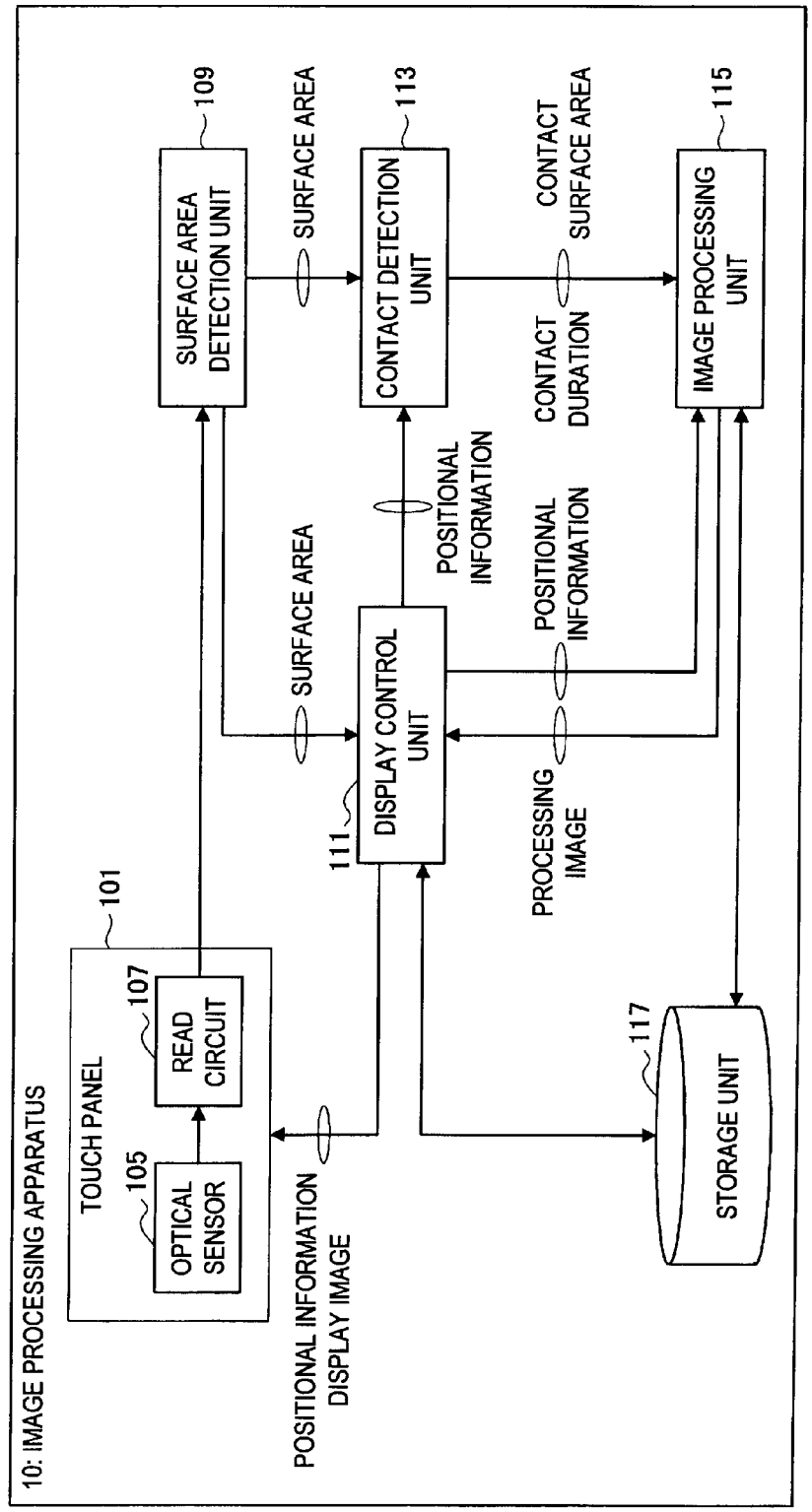
FIG. 3 is a block diagram illustrating a feature of the image processing apparatus according to the first embodiment.

Referring to FIG. 3, a functional structure of an image processing apparatus according to this embodiment will now be described in detail. FIG. 3 is a block diagram illustrating the functional structure of an image processing apparatus 10 according to this embodiment.

The image processing apparatus 10 according to this embodiment mainly includes a touch panel 101, a surface area detection unit 109, a display control unit 111, a contact detection unit 113, an image processing unit 115, and a storage unit 117, for example, as shown in FIG. 3.

The touch panel 101 has a display feature for displaying various images including objects, and a sensor feature for detecting a contact portion of an operator 12 in contact with a screen of the touch panel. An example of the display feature of the touch panel 101 is a feature for displaying object data received from the display control unit 111 as described later, an image processing result, and so on. The touch panel 101 displays these data based on positional information received from the display control unit 111 along with the object data, the image processing result, and so on. On the other hand, in terms of the sensor feature of the touch panel 101, the touch panel 101 is equipped with a mechanism for perceiving the contact portion of the operator 12 as a "surface" area, as described above.

As shown in FIG. 3, the touch panel 101 includes an optical sensor 105 and a read circuit 107. The optical sensor 105 detects an intensity of light incident from an outside of the touch panel 101. The read circuit 107 reads out the intensity of the light detected by the optical sensor 105 and detects a shade of the operator 12. For example, when the operator 12 contacts the touch panel 101, the shade of the operator 12 is reflected on the touch panel 101. The reflected shade of the operator 12 is detected by the optical sensor 105. The shade detected by the optical sensor 105 is read out by the read circuit 107. Information read out by the read circuit 107 includes a position and a shape of the shade and so on (hereinafter, referred to as shade data). Such shade data are input to the surface area detection unit 109 from the read circuit 107.

The surface area detection unit 109 may include, for example, Central Processing Unit (CPU), Read Only Memory (ROM), Random Access Memory (RAM), and so on. The surface area detection unit 109 detects a surface area corresponding to the operator 12 based on shade data received from the read circuit 107 of the touch panel 101. For example, when the operator 12 contacts the touch panel 101, one portion of the operator 12 that directly contacts the touch panel 101 and the other portion of the operator 12 that is in proximity to the touch panel 101 within equal to or less than a predetermined distance are both detected as the shade of the operator 12, and the shade data are input to the surface area detection unit 109. The shade data include a set of coordinates of points where an intensity of outside light is less than a predetermined value due to the shade of the operator 12. Then, the surface area detection unit 109 refers to the shade data and detects a group of continuous coordinates. It is noted that continuity of the coordinates may be determined in the manner that coordinates are considered to be consecutive if a distance between the coordinates is equal to or less than a predetermined distance. The group of the coordinates detected by the surface area detection unit 109 is perceived as a surface area corresponding to the operator 12. Information about the surface area is input to the display control unit 111 and the contact detection unit 113 from the surface area detection unit 109.

The display control unit 111 may include, for example, CPU, ROM, RAM, and so on. The display control unit 111 is a control means that controls contents to be displayed on the touch panel 101. For example, the display control unit 111 reads out object data, such as a thumbnail image of any image data recorded in the storage unit 117 described later, and displays the object data on the touch panel 101. In addition, the display control unit 111 specifies a display position of the object to the touch panel 101 and causes the touch panel 101 to display the object data at the specified display position. Furthermore, the display control unit 111 is associated with a predetermined image processing function and causes the touch panel 101 to display a processing result display area where a result of the predetermined image processing function applied to specified image data is displayed. For this purpose, the display control unit 111 holds information indicating display position of an object to be displayed on the touch panel 101 and the display position of the processing result display area. The information indicating display positions of the object and the processing result display area is input to the contact detection unit 113 from the display control unit 111.

The display control unit 111 receives information about a surface area from the surface area detection unit 109. For example, as the operator 12 in contact with the touch panel 101 moves, the display control unit 111 receives the information about the surface area from the surface area detection unit 109 in real time. In addition, the display control unit 111 receives image data of an exemplary image indicating an exemplary processing result of an image processing function and/or image data corresponding to an image processing result for the specified image data from the image processing unit 115 as later described. For example, when the display control unit 111 receives the image data of the exemplary image indicating the exemplary processing result of the image processing function, the display control unit 111 displays the received exemplary image in a predetermined processing result display area on a display screen. In addition, when the display control unit 111 receives the image data corresponding to the image processing result for some image data, the display control unit 111 displays the image data corresponding to the image processing result in a predetermined location.

The contact detection unit 113 may include, for example, CPU, ROM, RAM, and so on. The contact detection unit 113 receives the information about the surface area from the surface area detection unit 109, as described above. In addition, the contact detection unit 113 receives information indicating display positions of an object, a processing result display area, and/or various image data from the display control unit 111. Then, the contact detection unit 113 compares the surface area indicated by the information received from the surface area detection unit 109 with the information indicating the display positions received from the display control unit 111. As a result, the contact detection unit 113 detects an object, a processing result display area, various image data or the like, whose display position is located within the surface area. In this manner, the contact detection unit 113 can detect a size of a contact surface area where a surface area corresponding to the operator 12 contacts an object, such as a thumbnail of a process target image, a processing result display area, and/or various image data. In connection with detecting the contact surface area, the contact detection unit 113 can measure contact duration in which the surface area corresponding to the operator 12 contacts the various image data. Therefore, the contact detection unit 113 can measure, for example, contact duration in which the thumbnail corresponding to the process target image contacts the processing result display area, contact duration in which the operator 12 contacts the processing result display area, and so on.

The contact detection unit 113 transmits information about the detected contact surface area and information about the contact duration to the image processing unit 115, as later described. In addition, the contact detection unit 113 may transmit either the information about the contact surface area or the information about the contact duration to the image processing unit 115, as later described.

The image processing unit 115 may include, for example, CPU, ROM, RAM, and so on. The image processing unit 115 performs an image processing function related to a processing result display area on a process target image based on the information about the processing result display area included in the surface area and the information about the process target image, which are transmitted from the contact detection unit 113.

In this instance, the image processing unit 115 determines an execution parameter based on either the contact surface area or the contact duration transmitted from the contact detection unit 113 with regard to a processing function, such as a mosaic process, which requires the execution parameter.

A method for setting a value of an execution parameter depending on a size of a contact surface area and/or a length of contact duration can be appropriately determined. For example, in case of an image processing function involving an execution parameter, a contact surface area or contact duration and a value of the execution parameter to be set has previously been related in a database or the like, and the image processing unit 115 may select the execution parameter depending on the contact surface area or the contact duration transmitted from the contact detection unit 113. In addition, the image processing unit 115 may determine a proportional constant in advance so that the execution parameter is proportional to the size of the contact surface area or the length of the contact duration.

Furthermore, in case of an image processing function, such as a negative/positive reversal processing function, which does not require an execution parameter, the image processing unit 115 performs a predetermined processing function regardless of the contact surface area or the contact duration. The image processing unit 115 then transmits image data of a process target image, to which the image processing function has been applied, to the display control unit 111.

The image processing unit 115 generates an exemplary image indicating a processing result of an image processing function, which is related to its own processing result display area, and transmits the exemplary image to the display control unit 111. For example, if the negative/positive reversal processing function is assigned to the processing result display area, then the image processing unit 115 transmits a result acquired by performing the negative/positive reversal processing function on any image data as an exemplary image to the display control unit 111. In this manner, since the exemplary image indicating the processing result has previously been displayed in the processing result display area, a user can view which image is generated by performing the image processing function and perform an intuitive operation.

When the assigned image processing function requires an execution parameter, the image processing unit 115 may generate multiple exemplary images by performing the image processing function on image data using different values of the execution parameter, and transmit the generated multiple exemplary images to the display control unit 111. For example, when the assigned image processing function is a mosaic process, the image processing unit 115 may generate different exemplary images using different execution parameter's values and transmit each of the different exemplary images to the display control unit 111. The display control unit 111 may display the different exemplary images generated using the different execution parameter's values in series at a predetermined time interval so that a user can view a degree of effects of the execution parameter on the image processing function.

The storage unit 117 stores object data to be displayed on the touch panel 101. The object data described herein includes, for example, any parts forming a graphical user interface (hereinafter, referred to as "GUI"), such as icon, button, and thumbnail. In addition, the storage unit 117 may store object data of image data to which an image processing function can be applied. Furthermore, for each individual object data, the storage unit 117 stores attribute information that is related to the individual object data. The attribute information may include, for example, date and time of creation, date and time of update, creator name, and updater name of object data or entity data, type of entity data, size of entity data, importance, priority, and so on.

Furthermore, the storage unit 117 stores entity data corresponding to object data with the entity data and the object data being related to each other. The entity data described herein indicates data corresponding to a predetermined processing function performed when an object displayed on the touch panel 101 is operated. For example, the object data corresponding to the image data are associated with the image data as the entity data. The storage unit 117 also stores an image display application for displaying the image data such that the image display application is related to the object data, the image data, or the attribute information.

The object data stored in the storage unit 117 are read out by the display control unit 111 and displayed on the touch panel 101. In addition, the entity data stored in the storage unit 117 are read out by the image processing unit 115 and used for a predetermined image processing function.

Furthermore, the storage unit 117 can appropriately store not only these data, but also various parameters, an intermediate result of the processing function or the like, which the image processing apparatus 10 requires when it performs some processing functions, or various databases. The storage unit 117 is freely accessible to the surface area detection unit 109, the display control unit 111, the contact detection unit 113, the image processing unit 115, and so on.

An example of a feature of the image processing apparatus 10 according to this embodiment has been described above. Each of above components may be configured using a general purpose member or circuit, or may be configured with a dedicated hardware for a feature of each component. In addition, the feature of each component may be accomplished only by CPU and so on. Thus, the structure of the image processing apparatus 10 can be appropriately modified depending on the technological level at the time of implementing this embodiment.

<One Example of Display Screen>

Referring to FIG. 4 to FIG. 8, an example of a display screen in an image processing apparatus according to this embodiment will now be described in detail. FIG. 4 to FIG. 8 are explanatory diagrams illustrating an example of the display screen.

Figure 4:
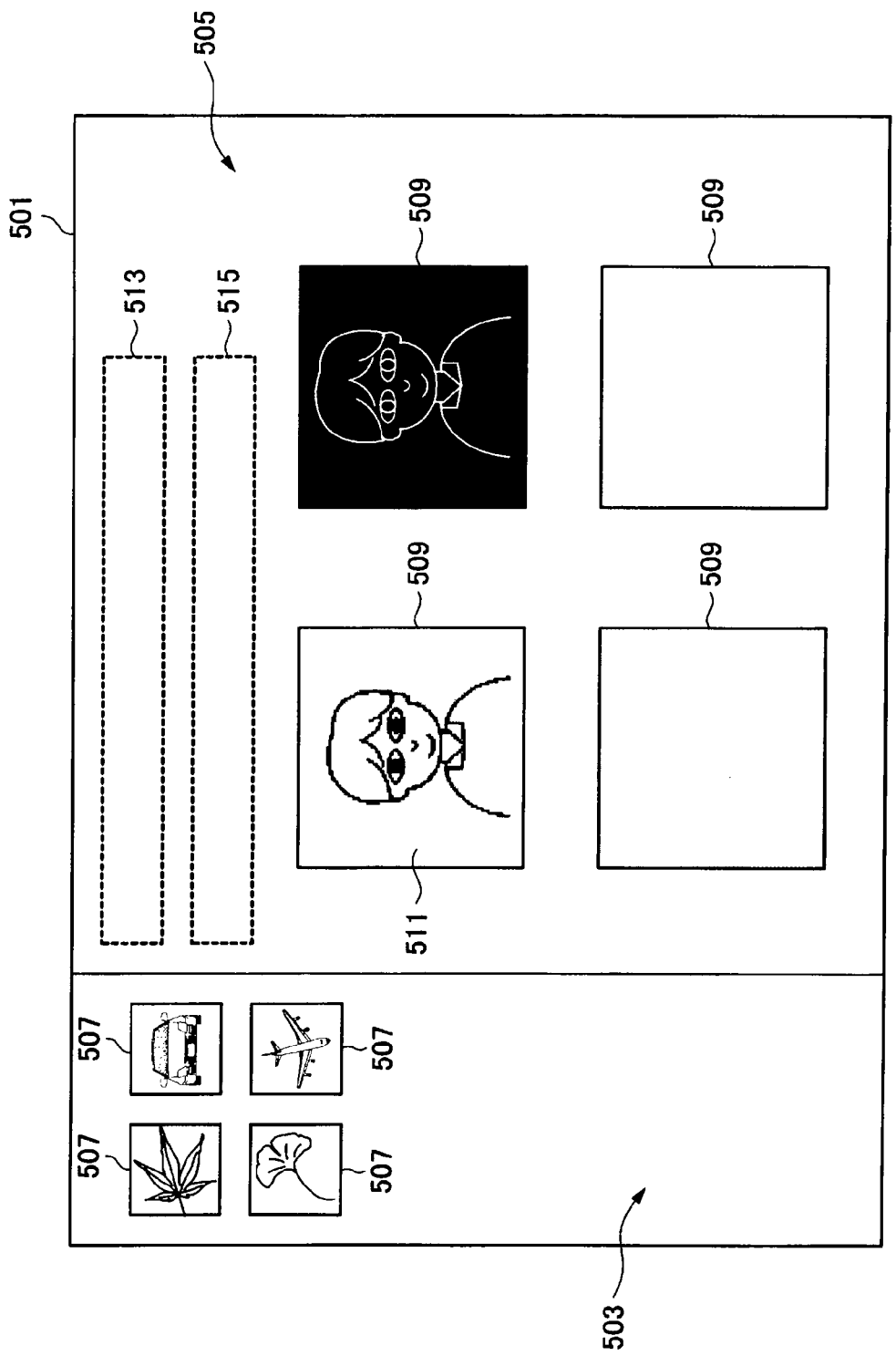
FIG. 4 is an explanatory diagram illustrating an example of a display screen.

Firstly, reference will be made to FIG. 4. A display screen 501 of an image processing apparatus 10 according to this embodiment includes a process target image display area 503 and an image processing execution area 505 as shown in FIG. 4, for example. The process target image display area 503 is an area where information about a process target image, to which an image processing function is applied, is displayed. On one hand, in this process target image display area 503, object data, such as a thumbnail 507 of the process target image are displayed. On the other hand, in the image processing execution area 505, a plurality of processing result display areas 509 concerning respective image processing functions that can be performed in the image processing apparatus 10 is displayed. In addition, in a processing result display area 509, an exemplary image 511 is displayed, which indicates a processing result when an image processing function assigned to the processing result display area is performed.

For example, a processing result display area 509 shown in a top left part of the image processing execution area 505 is an area to which a mosaic processing function is assigned, and an image of a person subject to the mosaic processing function is displayed as an exemplary image 511. In addition, a processing result display area 509 shown in a top right part of the image processing execution area 505 is an area to which a negative/positive reversal processing function is assigned, and an image of a person subject to the reversal processing function is displayed as an exemplary image 511.

It is noted that although, in FIG. 4, there are processing result display areas 509 where an exemplary image 511 is not displayed, this is for convenience of explanation and exemplary images 511 corresponding to contents of image processing functions may be displayed in these processing result display areas 509 also.

It is also noted that, as shown in FIG. 4, for example, an image processing selection object display area 513 may be provided in the image processing execution area 505 for displaying an object, such as an icon, related to an executable image processing function in the image processing apparatus 10. In addition, a file operation selection object display area 515 may be provided in the image processing execution area 505 for displaying an object, such as an icon, to perform various file operations, such as storing of image data after an image processing function.

Although, in FIG. 4, the process target image display area 503 and the image processing execution area 505 are arranged on the left and right sides, respectively, in the display screen 501, the process target image display area 503 and the image processing execution area 505 may be arranged on top and bottom parts in the display screen 501.

Next, reference will be made to FIG. 5. A user of the image processing apparatus 10 operates the operator 12, such as a finger or a stylus, and selects an image processing function, which he/she desires to apply, among thumbnails 507 of a process target image displayed in the process target image display are 503. As the operator 12 is operated, a surface area corresponding to the operator 12 appears on the touch panel 101 in the display screen 501. When this surface area contacts a certain thumbnail 507 and the thumbnail 507 is selected by an operation, such as a tap operation, the display control unit 111 changes a display status of the selected thumbnail 507 of the process target image into a selection status. Subsequently, when the user operates the operator 12 to drag the selected thumbnail 507, the display control unit 111 controls display so that the thumbnail 507 seems to move in response to operation of the operator 12. When the operator 12 overlaps a certain processing result display area 509 and leaves the touch panel 101 (that is to say, a drop operation is performed) by user's manipulation, the image processing apparatus 10 determines that a image processing function corresponding to the processing result display area 509 has been selected. In particular, when the thumbnail 507 of the process target image and the processing result display area 509 contact with each other in an overlapping manner in an identical surface area corresponding to the operator 12, the image processing unit 115 will determine that an image processing function corresponding to the processing result display area 509 in contact with the thumbnail 507 has been selected. In addition, when a center of the thumbnail 507 of a process target image is located within a processing result display area 509 or an exemplary image 511, the image processing unit 115 may determine that an image processing function corresponding to the processing result display area 509 within which the center of the thumbnail 507 is located has been selected.

Figure 5:
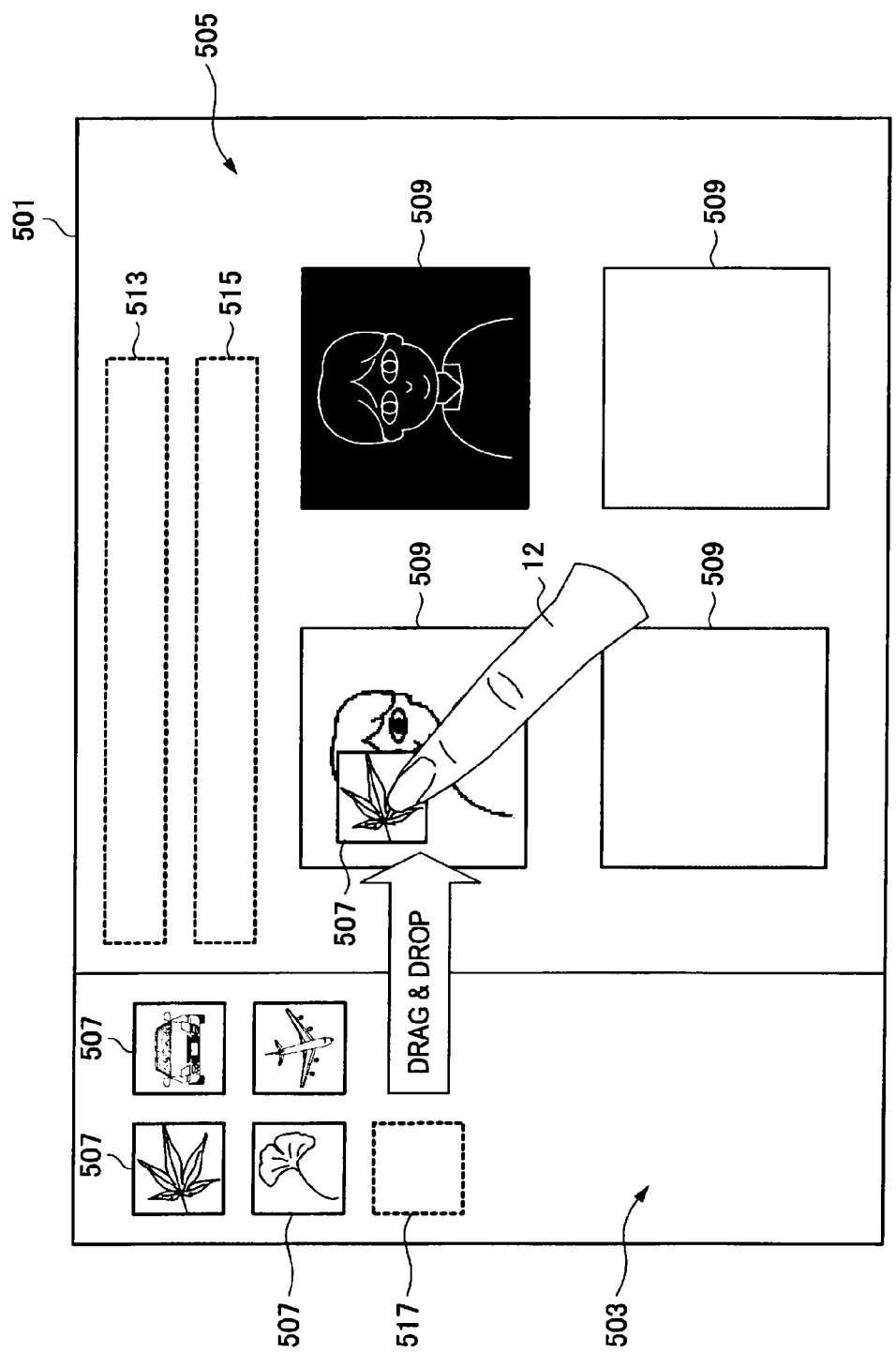
FIG. 5 is an explanatory diagram illustrating an example of a display screen.

For example, in an example shown in FIG. 5, a user operates the operator 12 so that a thumbnail 507 of a process target image is dropped onto a processing result display area 509 (i.e., a processing result display area 509 corresponding to a mosaic processing function) located at a top left part of an image processing execution area 503. In this case, the image processing unit 115 determines that the mosaic processing function has been selected and performs the relevant processing function on entity data of the process target image.

It is also possible to drag and drop a thumbnail 507, which has been dropped onto a certain processing result display area 509, again onto a different processing result display area 509. In this case, the image processing unit 115 may perform a new image processing function, in an overwriting manner, on the entity data of the process target image to which some image processing functions have been already applied, or may perform the new image processing function on the entity data after cancelling some already applied image processing functions.

It is noted that although storing of image data after performing an image processing function can be achieved in various ways, storing can be performed, for example, by dragging and dropping a processed thumbnail onto a section 517 in the process target image display area 503 on which a thumbnail is not displayed.

Figure 6:
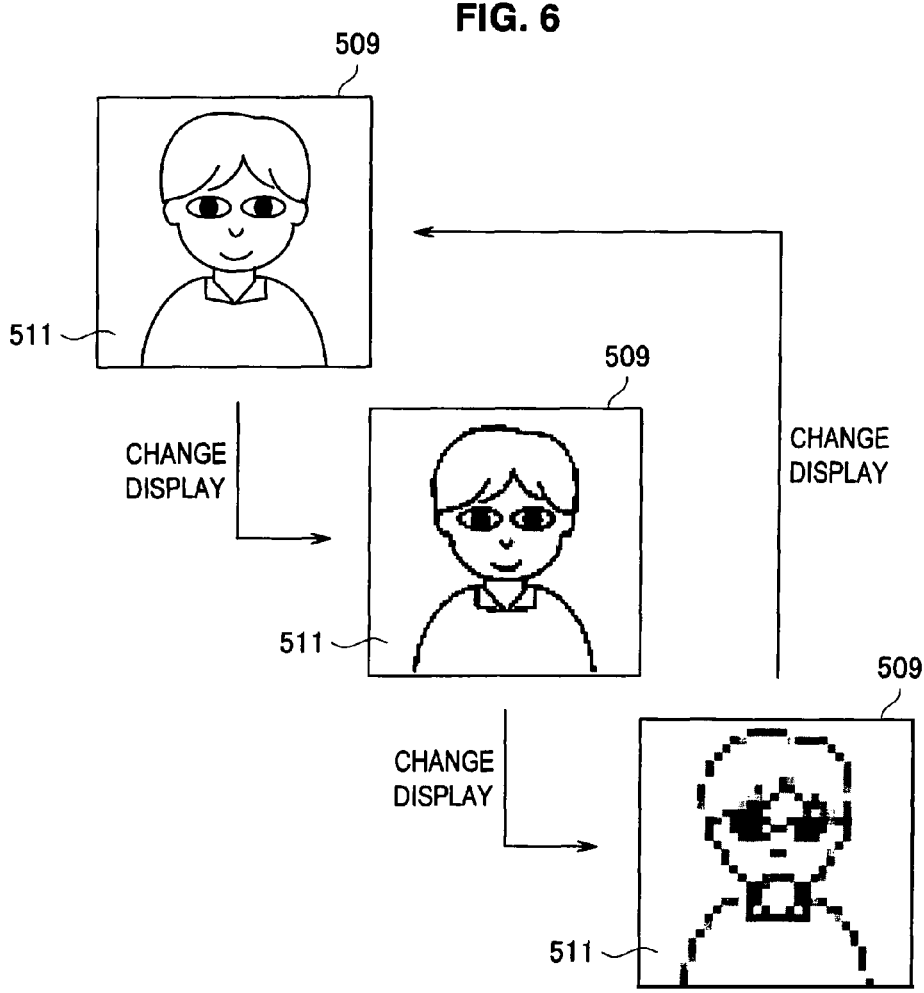
FIG. 6 is an explanatory diagram illustrating an example of a display screen.
Figure 7:
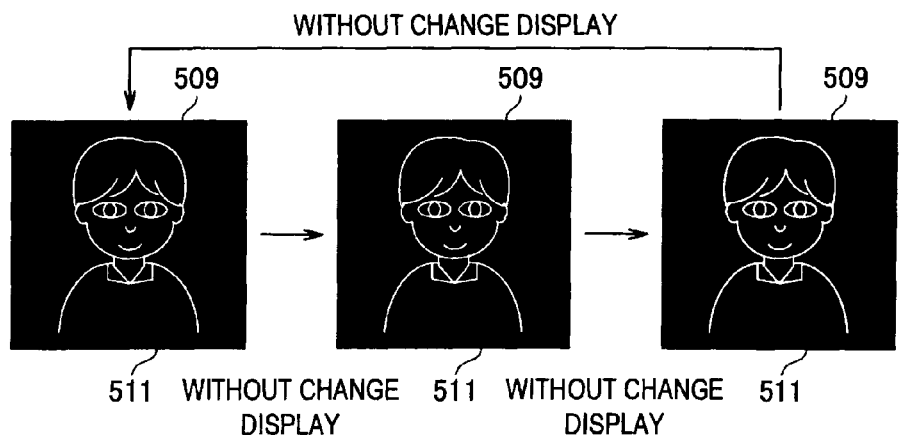
FIG. 7 is an explanatory diagram illustrating an example of a display screen.

As described above, in case of an image processing function where a processing result varies depending on a setting value of an execution parameter, multiple exemplary images, which would be acquired by performing the image processing function using execution parameter with different setting values, are sequentially displayed at a predetermined time interval. For example, in FIG. 4 and FIG. 5, the mosaic processing function assigned to the processing result display area 509, which is located at a top left part of the image processing execution area 503, is a processing function that requires setting of the execution parameter. In this case, for example, as shown in FIG. 6, exemplary images 511, which has been acquired by performing the processing function using three different execution parameter's values, are sequentially displayed at a predetermined time interval (e.g., every few seconds) in the processing result display area 509. In addition, in FIG. 4 and FIG. 5, a negative/positive reversal processing function assigned to the processing result display area 509, which is located at a top right part of the image processing execution area 503 is an image processing function that does not require setting of the execution parameter and can be performed without using the execution parameter. In this case, as shown in FIG. 7, for example, exemplary images 511 are displayed in a processing result display area 509 without changing over time.

In this manner, on one hand, if a processing result varies depending on an execution parameter, it is possible to intuitively present to a user the fact that the processing result varies depending on the execution parameter by changing the exemplary images 511 to be displayed at a predetermined time interval. On the other, in case of an image processing function where an execution parameter is not required or the execution parameter does not have an effect on a processing result, changing of the displayed exemplary image 511 would not be carried out. Thus, a user can intuitively perceive that this image processing function will only produce a unique processing result.

Figure 8:
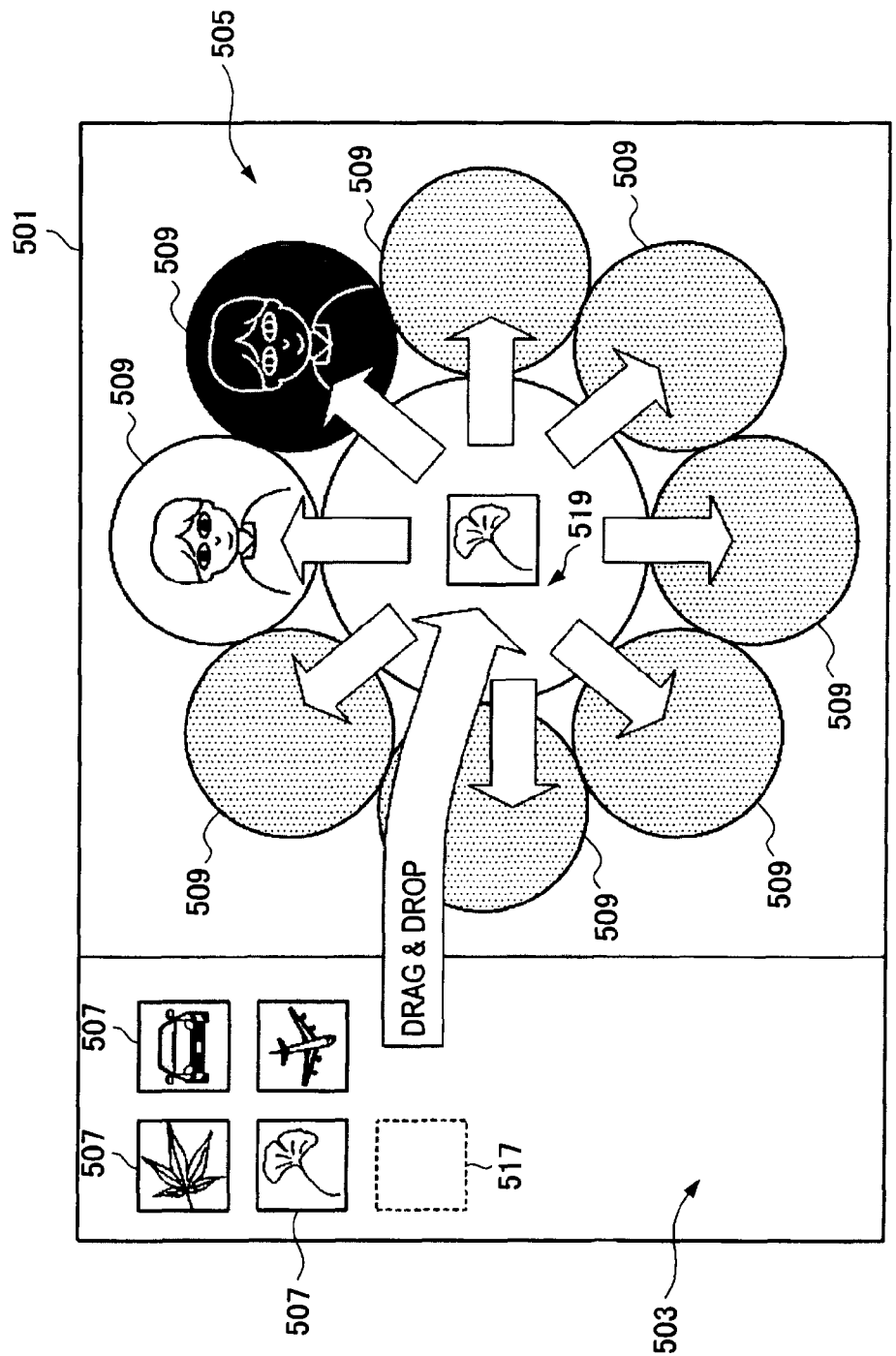
FIG. 8 is an explanatory diagram illustrating an example of a display screen.

Reference will now be made to FIG. 8. In FIG. 4 and FIG. 5, an example is shown in which processing result display areas 509 are tiled in the image processing execution area 503. However, a layout of the processing result display areas 509 is not limited to the example shown in FIG. 4 and FIG. 5, and the processing result display areas 509 may be arranged as shown in FIG. 8, for example.

In an example shown in FIG. 8, an object drop area 519 onto which an object such as a thumbnail 507 of a process target image can be dropped is provided approximately at a center of an image processing execution area 503. In addition, multiple processing result display areas 509 are provided around the object drop area 519 in a manner surrounding the object drop area 519.

Thumbnails 507 of the process target image that have been dropped onto the object drop area 519 may, for example, be automatically dragged and dropped onto processing result display areas 509, respectively, and image processing functions corresponding to the processing result display areas 509 are performed, respectively. Therefore, for example, in an example shown in FIG. 8, a user can simultaneously view processing results, which have been produced by performing eight different image processing functions, by dropping a thumbnail 507 of a certain process target image onto the object drop area 519. In addition, even if such an object drop area 519 is provided, the user can apply a specific image processing function to the process target image by directly dropping the thumbnail 507 onto an individual processing result display area 509.

It is noted that, in FIG. 4, FIG. 5, FIG. 8, and so on, the processing result display area 509 displayed in the image processing execution area 503 may be configured so that a processing result display area 509 to which a specific image processing function is assigned is displayed all the time. In addition, the processing result display area 509 to be displayed may be changed in response to a scroll operation by the operator 12 and so on.

<Image Processing Method>

Referring to FIGS. 9 to 13, an image processing method according to this embodiment will now be described in detail.

[Flow of Image Processing Method]

Figure 9:
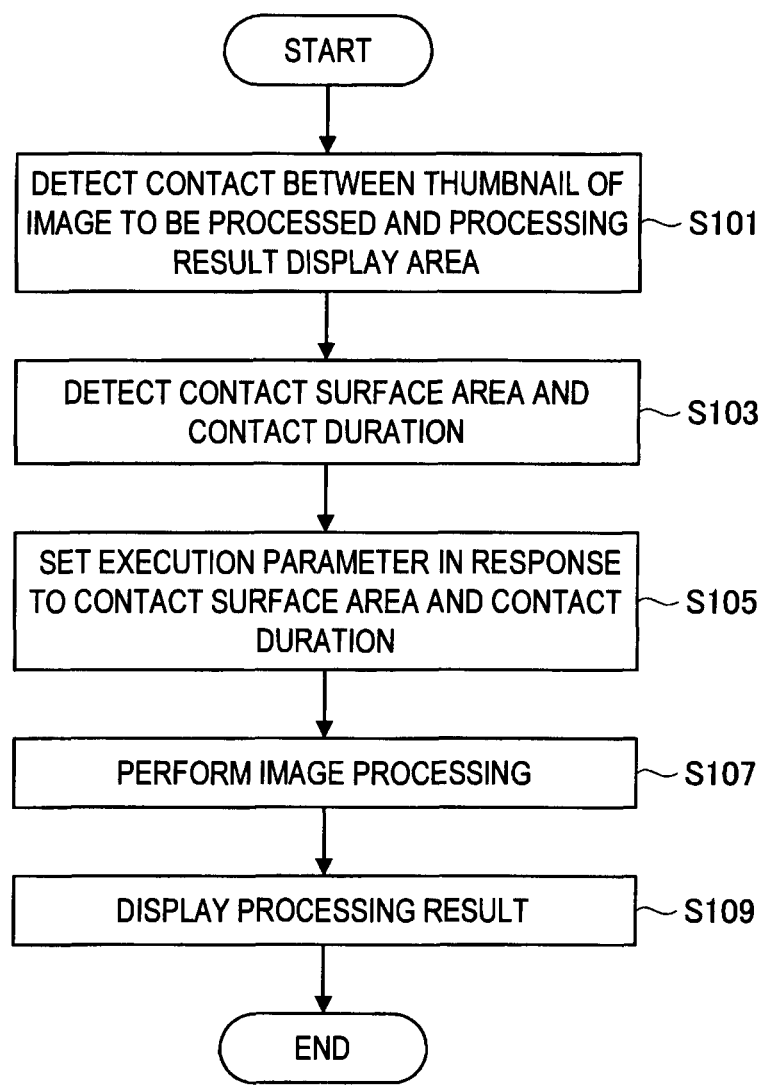
FIG. 9 is a flowchart illustrating an image processing method according to the first embodiment.
Figure 10:
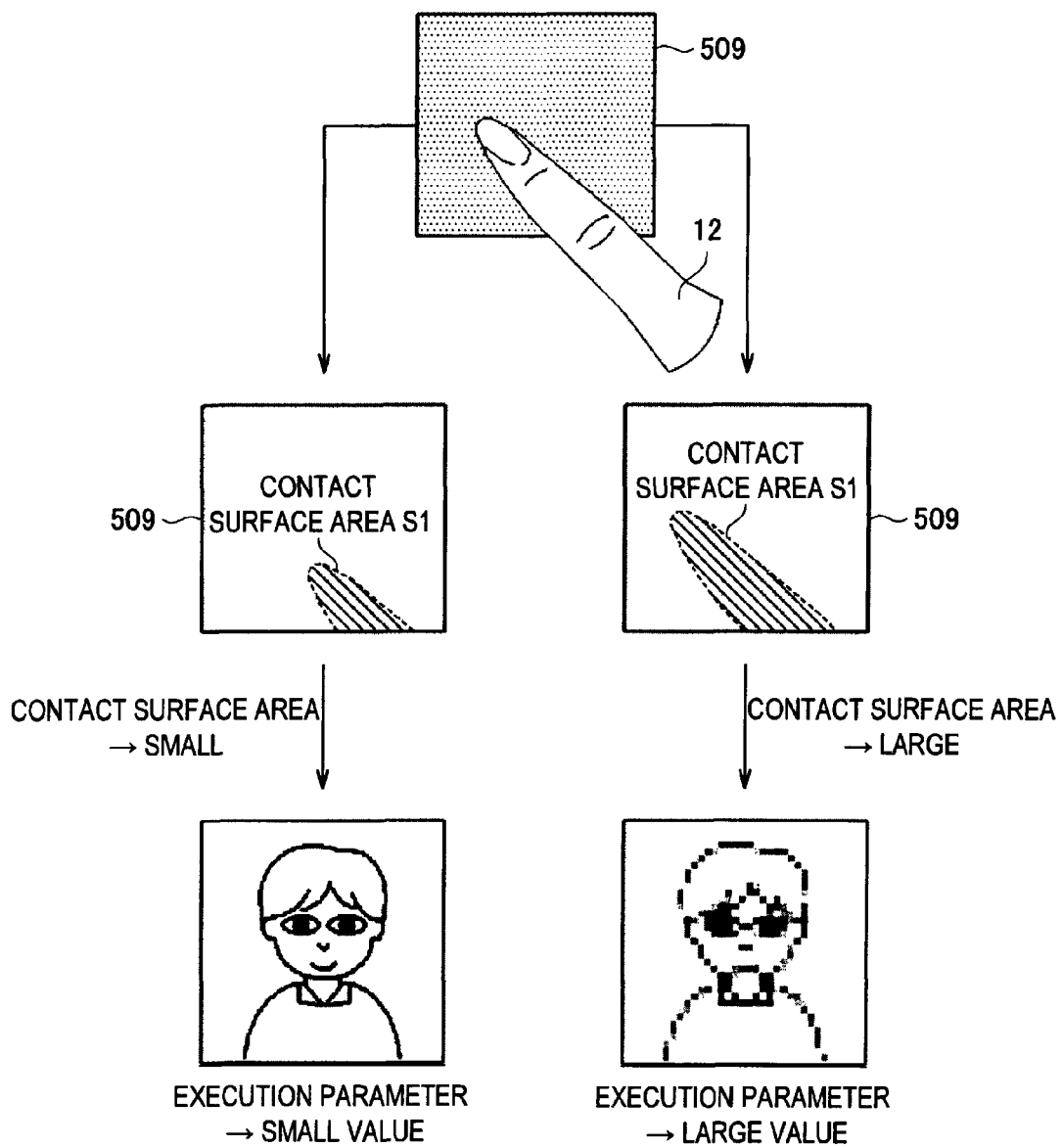
FIG. 10 is an explanatory diagram illustrating the image processing method according to the first embodiment.
Figure 11:
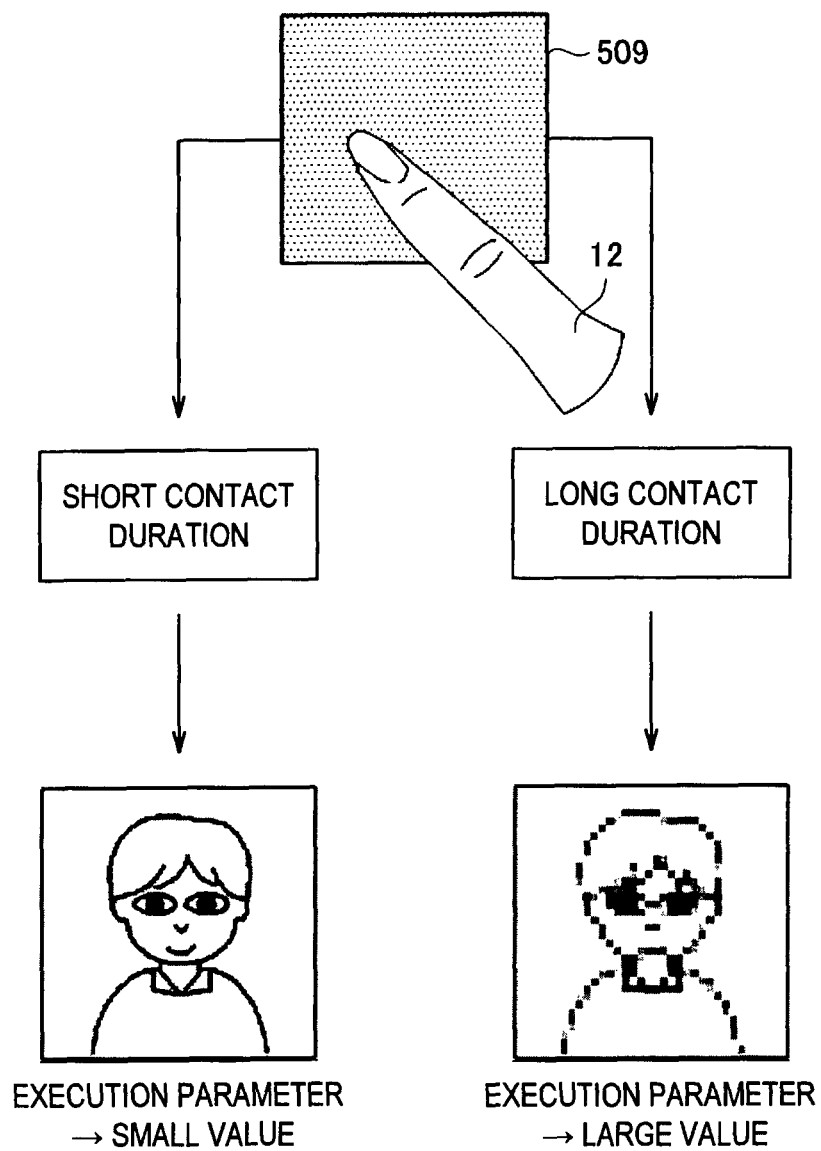
FIG. 11 is an explanatory diagram illustrating the image processing method according to the first embodiment.

Firstly, referring to FIGS. 9 to 11, a flow of the image processing method according to this embodiment will be described in detail. FIG. 9 is a flowchart illustrating the image processing method according to this embodiment. FIG. 10 and FIG. 11 are explanatory diagrams illustrating the image processing method according to this embodiment, respectively.

A user selects a thumbnail 507 or the like of a process target image, and drags and drops the selected thumbnail 507 or the like onto a processing result display area 509, in which an exemplary image 511 corresponding to a image processing function intended to be performed is displayed, by operating an operator 12, such as a finger or a stylus. During this operation, a surface area detection unit 109 detects a surface area in real time based on data transmitted from a touch panel 101. In addition, a contact detection unit 113 detects whether there is a thumbnail 507 or a processing result display area 509 in contact with the surface area based on information acquired from the surface area detection unit 109 and a display control unit 111.

Once the contact detection unit 113 has detected contact between a thumbnail 507 of the process target image and a processing result display area 509 (step S101), the contact detection unit 113 detects a contact surface area between the operator 12 and the processing result display area 509, and its contact duration (step S103).

In particular, the contact detection unit 113 detects whether the surface area corresponding to the operator 12 contacts the thumbnail 507 of the process target image and the processing result display area 509, and the thumbnail 507 and the processing result display area 509 contact with each other in a overlapping manner. If this is the case, it can be seen that the thumbnail 507 has been dragged and dropped onto the processing result display area 509 by the operator 12. If this is done, the contact detection unit 113 detects a size of a contact surface area where the surface area corresponding to the operator 12 and the processing result display area 509 overlap and a length of its contact duration.

It is noted that measurement of the contact duration may begin when the thumbnail 507 starts overlapping with the processing result display area 509 or when the thumbnail 507 has been dropped onto the processing result display area 509.

The contact detection unit 113 transmits the above acquired size of the contact surface area and length of the contact duration to an image processing unit 115.

The image processing unit 115 applies an image processing function corresponding to the processing result display area 509, with which the thumbnail 507 contacts, to entity data corresponding to the thumbnail 507. In particular, if the image processing function corresponding to the processing result display area 509 requires an execution parameter, the image processing unit 115 sets an execution parameter's value depending on at least one of the size of the contact surface area and the length of the contact duration (step S105). Then, the image processing unit 115 performs a predetermined image processing function depending on the set execution parameter's value (step S107). If the image processing function to be performed does not require the execution parameter, that is, when the image processing function is a kind of a negative/positive reversal processing function, for example, the image processing unit 115 may execute step S107 without executing step S105.

Once the image processing function is complete, the image processing unit 115 transmits image data acquired from the image processing function to the display control unit 111. The display control unit 111 changes an image displayed on a display screen from the process target image to a processed image (step S109).

Firstly, a case where, for example, the image processing unit 115 sets an execution parameter depending on a size of a contact surface area will be considered. For example, as shown in FIG. 10, once a thumbnail 507 of a process target image has been dropped onto a processing result display area 509 corresponding to a mosaic processing function, the image processing unit 115 sets an execution parameter depending on a size of a contact surface area S1 transmitted from the contact detection unit 113. An execution parameter's value that determines a degree of mosaic is appropriately determined depending on the size of the contact surface area S1 and in accordance with a given method. In one hand, if the size of the contact surface area S1 is small, a relatively small value will be set as the execution parameter's value. As a result, as shown in left side of FIG. 10, a processing degree of the mosaic processing function is low. On the other hand, if the size of the contact surface area S1 is large, a relatively large value will be set as the execution parameter's value. As a result, as shown in right side of FIG. 10, a processing result will indicate that the mosaic processing function has been sufficiently performed.

Secondly, a case where, for example, the image processing unit 115 sets an execution parameter depending on a length of processing duration will be considered. For example, as shown in FIG. 11, once a thumbnail 507 of a process target image has been dropped onto a processing result display area 509 corresponding to a mosaic processing function, the image processing unit 115 sets an execution parameter depending on a length of contact duration transmitted from the contact detection unit 113. An execution parameter's value that determines a degree of mosaic is appropriately determined depending on the length of the contact duration and in accordance with a given method. In one hand, if the length of the contact duration is short, a relatively small value will be set as the execution parameter's value. As a result, as shown in left side of FIG. 11, a processing degree of the mosaic processing function is low. On the other hand, if the length of the contact duration is long, a relatively large value will be set as the execution parameter's value. As a result, as shown in right side of FIG. 11, a processing result will indicate that the mosaic processing function has been sufficiently performed.

Figure 12:
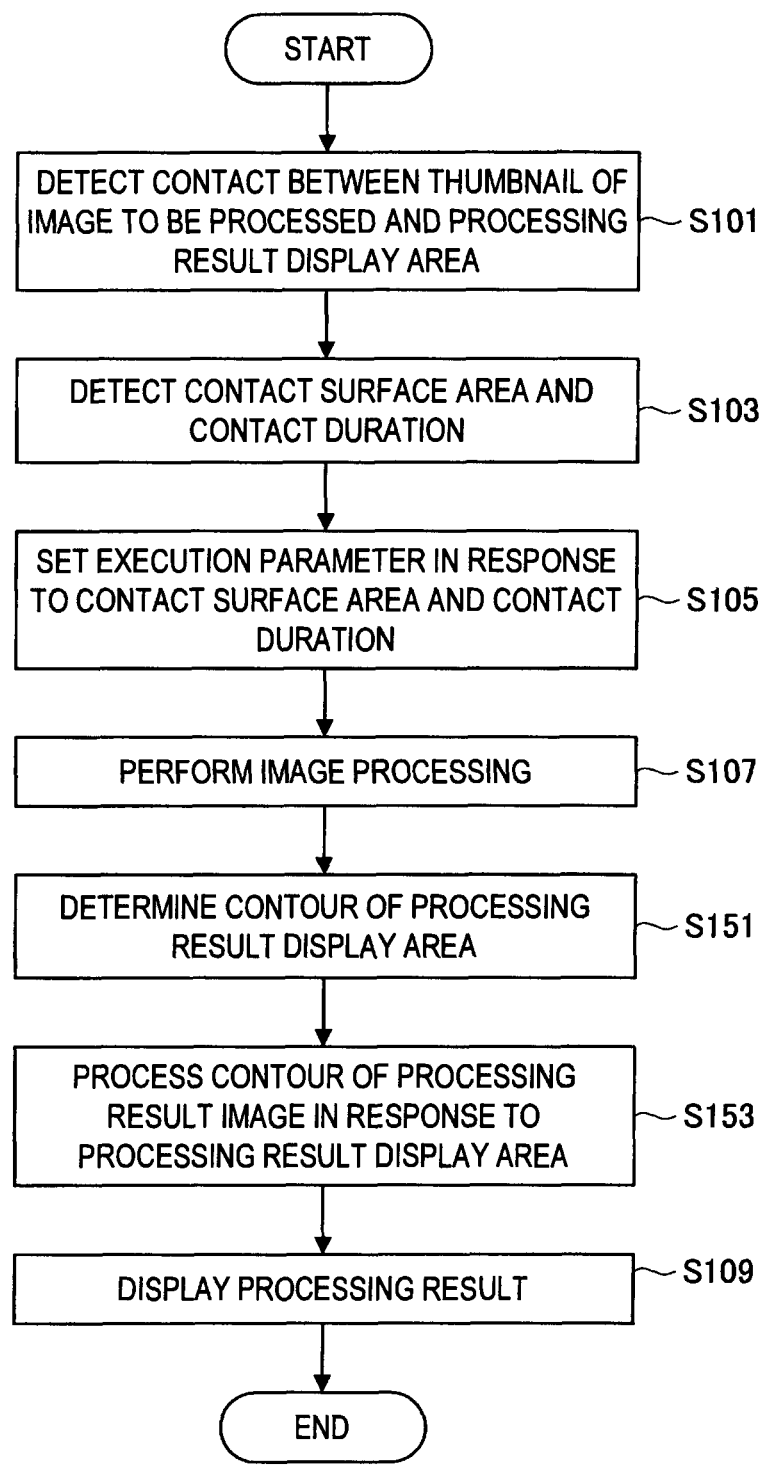
FIG. 12 is a flowchart illustrating the image processing method according to the first embodiment.
Figure 13:
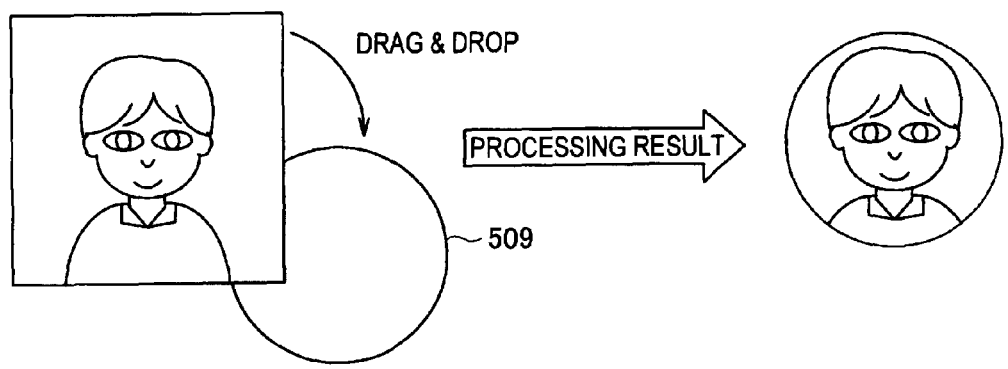
FIG. 13 is an explanatory diagram illustrating the image processing method according to the first embodiment.

It is noted that the image processing unit 115 is capable of performing processing functions as shown in later-described FIG. 12 and FIG. 13, respectively, depending on a contour of a processing result display area 509. FIG. 12 is a flowchart illustrating an image processing method according to this embodiment. FIG. 13 is an explanatory diagram illustrating the image processing method according to this embodiment.

A contour (outer frame) of a processing result display area 509 shown in FIG. 4 or the like has a substantially rectangular shape and a contour of a processing result display area 509 shown in FIG. 8 has a substantially circular shape. Consequently, the image processing unit 115 may deform a contour of a process target image so that the contour of the process target image conforms to the contour of the processing result display area 509. In other words, if the contour of the processing result display area 509 has the substantially rectangular shape, the image processing unit 115 can make the shape of the process target image have the substantially rectangular shape in conformity to the shape of the processing result display area 509. In addition, if the contour of the processing result display area 509 has the substantially circular shape, the image processing unit 115 can make the shape of the process target image have the substantially circular shape in conformity to the shape of the processing result display area 509. It is noted that the shape of the processing result display area 509 is not limited to the substantially rectangular shape or the substantially circular shape, but may have any shapes, such as a star or a triangle. As a result, the image processing unit 115 can change the shape of the process target image into any shapes in conformity to the shape of the processing result display area 509.

A processing function for deforming the process target image may be additionally performed after step S107 shown in FIG. 9 and FIG. 12. In other words, the image processing unit 115, at the beginning, determines a contour of the processing result display area 509 to which the image processing function performed in step S107 is assigned (step S151). Subsequently, the image processing unit 115 changes a contour of the process target image into the determined contour of the processing result display area 509 in conformity to the determined contour of the processing result display area 509 (step S153). The image processing unit 115 may register a center of the processing result display area 509 with a center of the process target image to apply a die-cutting processing function to the process target image, or may expand or reduce the process target image in conformity to the shape of the processing result display area 509.

In this manner of processing, as shown in FIG. 13, for example, the process target image having a substantially rectangular shape that overlaps with the processing result display area 509 having a substantially circular shape will be changed into the image having a substantially circular shape after performing this processing function.

It is noted that a contour processing function of the image as shown in FIG. 12 and FIG. 13 may be performed after performing step S107 as shown in FIG. 12 or may be performed between step S105 and step S107.

Second Embodiment

Functional Structure of Image Processing Apparatus

Figure 14:
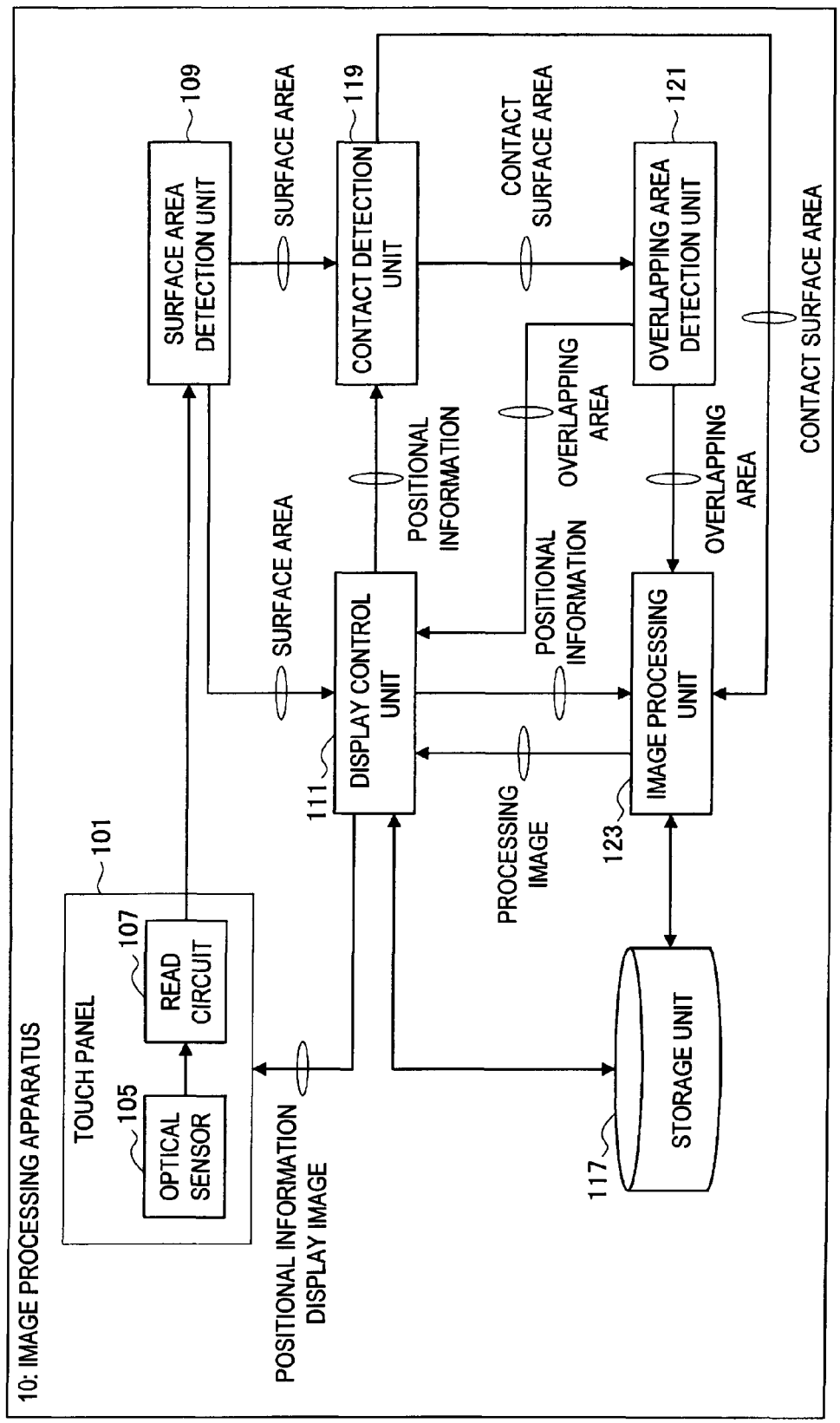
FIG. 14 is a block diagram illustrating a feature of an image processing apparatus according to a second embodiment of the present invention.

Referring to FIG. 14, a structure of an image processing apparatus according to a second embodiment of the present invention will now be described in detail. FIG. 14 is a block diagram illustrating the structure of an image processing apparatus according to this embodiment.

The image processing apparatus 10 according to this embodiment mainly includes a touch panel 101, a surface area detection unit 109, a display control unit 111, a storage unit 117, a contact detection unit 119, an overlapping area detection unit 121, and an image processing unit 123, for example, as shown in FIG. 14.

The touch panel 101, the surface area detection unit 109, the display control unit 111, and the storage unit 117 according to this embodiment has a similar feature and generally the same effect as the touch panel 101, the surface area detection unit 109, the display control unit 111, and the storage unit 117 of the first embodiment of the present invention. Thus, a detailed description is omitted in connection with this embodiment.

The image processing unit 123 according to this embodiment has a similar feature and generally the same effect as the image processing unit 115 according to the first embodiment of the present invention except that the image processing unit 123 performs an image processing function only on an overlapping area detected by the later-described overlapping area detection unit 121. In addition, the image processing unit 123 may set an execution parameter depending on a contact surface area and contact duration, as described in the first embodiment, and perform an image processing function on the overlapping area. Thus, a detailed description is omitted in connection with this embodiment.

The contact detection unit 119 includes, for example, CPU, ROM, RAM, and so on. The contact detection unit 119 receives information about a surface area from the surface area detection unit 109. In addition, the contact detection unit 119 receives information indicating display positions of an object, a processing result display area, and/or various image data from the display control unit 111. Then, the contact detection unit 119 compares the surface area indicated by the information received from the surface area detection unit 109 with the information indicating the display positions received from the display control unit 111. As a result, the contact detection unit 119 detects a contact object, such as an object, a processing result display area, various image data or the like, whose display position is located within the surface area. In this manner, the contact detection unit 119 can detect a size of a contact surface area where a surface area corresponding to an operator 12 contacts an object, such as a thumbnail of a process target image, a processing result display area, and/or various image data. In connection with detecting the contact surface area, the contact detection unit 119 can measure contact duration in which the surface area corresponding to the operator 12 contacts the various image data. Therefore, the contact detection unit 119 can measure, for example, contact duration in which the thumbnail corresponding to the process target image contacts the processing result display area, contact duration in which the operator 12 contacts the processing result display area, and so on.

The contact detection unit 119 transmits information about the detected contact surface area to the overlapping area detection unit 121 and the image processing unit 123. In addition, the contact detection unit 119 may transmit information about the contact duration to the image processing unit 123.

The overlapping area detection unit 121 includes, for example, CPU, ROM, RAM, and so on. The overlapping area detection unit 121 detects an overlapping area where a process target image or the like contacts a processing result display area when the process target image or a thumbnail of the process target image in contact with a surface area, or the like overlaps at least a part of the processing result display area 509. The overlapping area can be detected based on information about a contact surface area transmitted from the contact detection unit 119, positional information of the process target image or the processing result display area acquired from the display control unit 111, and so on. In particular, the overlapping area detection unit 121 detects the overlapping area by comparing the positional information of the process target image or the processing result display area, the information about the contact surface area, and so on with each other.

If the thumbnail of the process target image overlaps with the processing result display area, the overlapping area detection unit 121 can determine a position or a size of the overlapping area based on a relation between size of the thumbnail and size of the entity data of the process target image, and so on. For example, the overlapping area detection unit 121 can identify the overlapping area in the entity data using a correspondence relation between pixels forming the thumbnail and pixels forming the entity data, a ratio between size of the thumbnail and size of the entity data, and so on.

The overlapping area detection unit 121 transmits information about the detected overlapping area to the display control unit 111 and image processing unit 123.

An example of a feature of the image processing apparatus 10 according to this embodiment has been described above. Each of above components may be configured using a general purpose member or circuit, or may be configured with a dedicated hardware for a feature of each component. In addition, the feature of each component may be accomplished only by CPU and so on. Thus, the structure of the image processing apparatus 10 can be appropriately modified depending on the technological level at the time of implementing this embodiment.

It is noted that a method for performing an image processing function only on an overlapping area according to this embodiment can be applied to an image processing apparatus according to the first embodiment of the present invention.

<Image Processing Method>

Figure 15:
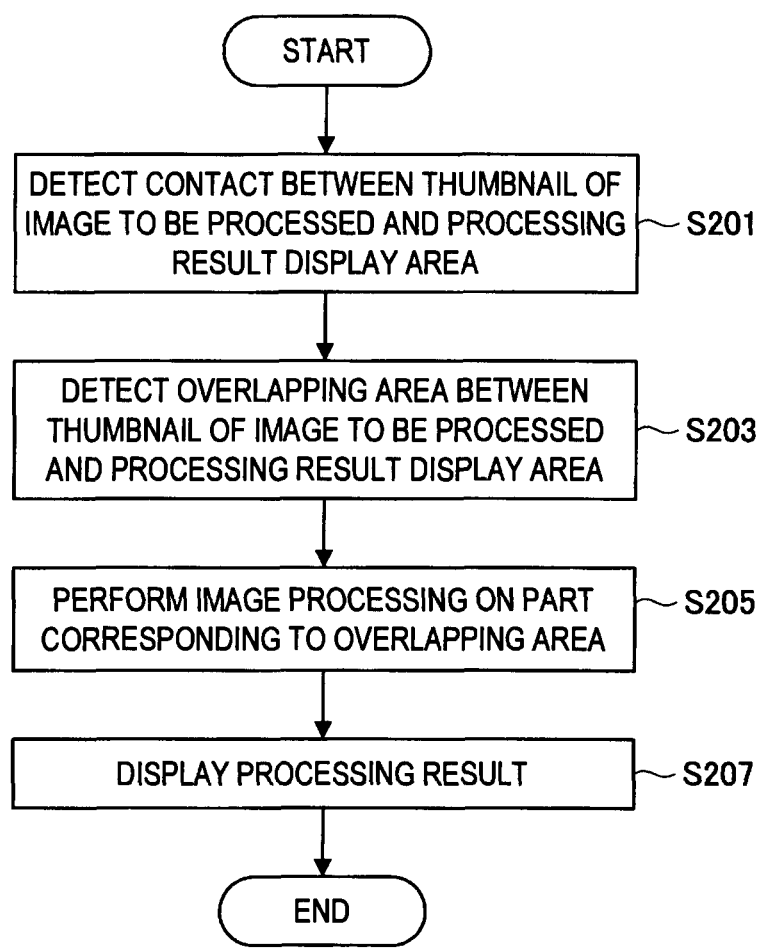
FIG. 15 is a flowchart illustrating the image processing method according to the second embodiment.
Figure 16:
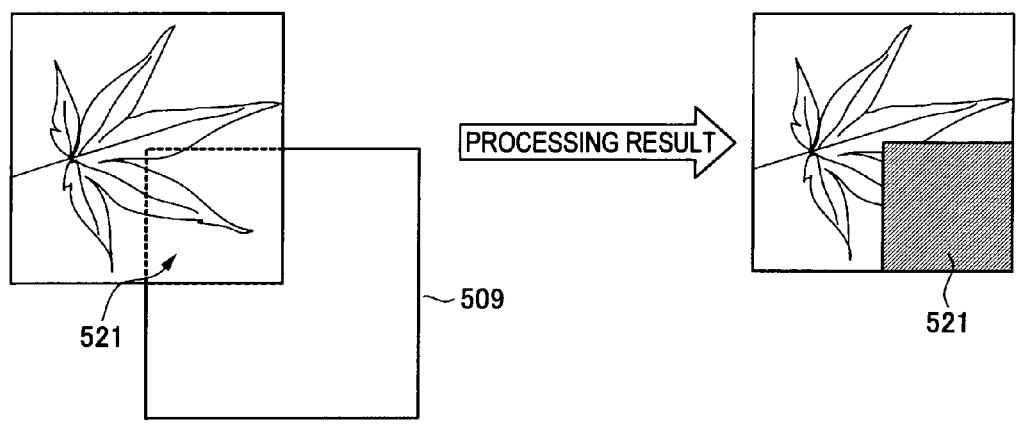
FIG. 16 is an explanatory diagram illustrating the image processing method according to the second embodiment.

Referring to FIGS. 15 and 16, an image processing method according to this embodiment will now be described in detail. FIG. 15 is an explanatory diagram illustrating the image processing method according to this embodiment. FIG. 16 is a flowchart illustrating the image processing method according to this embodiment.

A user selects a thumbnail 507 or the like of a process target image, and drags and drops the selected thumbnail 507 or the like onto a processing result display area 509, in which an exemplary image 511 corresponding to a image processing function intended to be performed is displayed, by operating an operator 12, such as a finger or a stylus. During this operation, a surface area detection unit 109 detects a surface area in real time based on data transmitted from a touch panel 101. In addition, a contact detection unit 119 detects whether there is a thumbnail 507 or a processing result display area 509 in contact with the surface area based on information acquired from the surface area detection unit 109 and a display control unit 111.

Once the contact detection unit 119 has detected contact between the thumbnail 507 of the process target image and the processing result display area 509 (step S201), the contact detection unit 119 transmits information about a contact surface area between the operator 12 and the processing result display area 509 to an overlapping area detection unit 121 and an image processing unit 123.

The overlapping area detection unit 121 detects the overlapping area where the process target image and the processing result display area overlap with each other using the information about the contact surface area transmitted from the contact detection unit 119, positional information acquired from a display control unit 111, and so on (step S203). The overlapping area detection unit 121 transmits information about the detected overlapping area to the display control unit 111 and the image processing unit 123.

The image processing unit 123 performs an image processing function on a part of the process target image, which corresponds to the overlapping area, based on the transmitted information about the overlapping area (step S205). It is noted that, in performing the image processing function, the image processing unit 123 may set an execution parameter depending on a size of a contact surface area, contact duration, or the like transmitted from the contact detection unit 119.

Once the image processing function is complete, the image processing unit 123 transmits image data acquired from the image processing function to the display control unit 111. The display control unit 111 changes an image displayed on a display screen from the process target image to a processed image (step S207).

In this manner of processing, it is possible to perform an image processing function only on a desired part of a process target image. For example, as shown in FIG. 16, a case where a certain process target image has been dragged and dropped onto a processing result display area 509 so that a bottom right part of the process target image overlaps with the processing result display area is considered. In this case, the bottom right part of the process target image shown in FIG. 16 corresponds to an overlapping area 521. The overlapping area detection unit 121 detects and transmits a part and a size of this overlapping area 521 to the image processing unit 123. As a result, the image processing unit 123 performs an image processing function only on a part corresponding to the overlapping area 521 of the process target image, as shown in right side of FIG. 16.

It is noted that, in performing the image processing function as shown in FIG. 16, it is possible to perform the image processing function on any parts of process target images having any sizes by appropriately modifying a size of the processing result display area 509.

<Hardware Structure>

Figure 17:
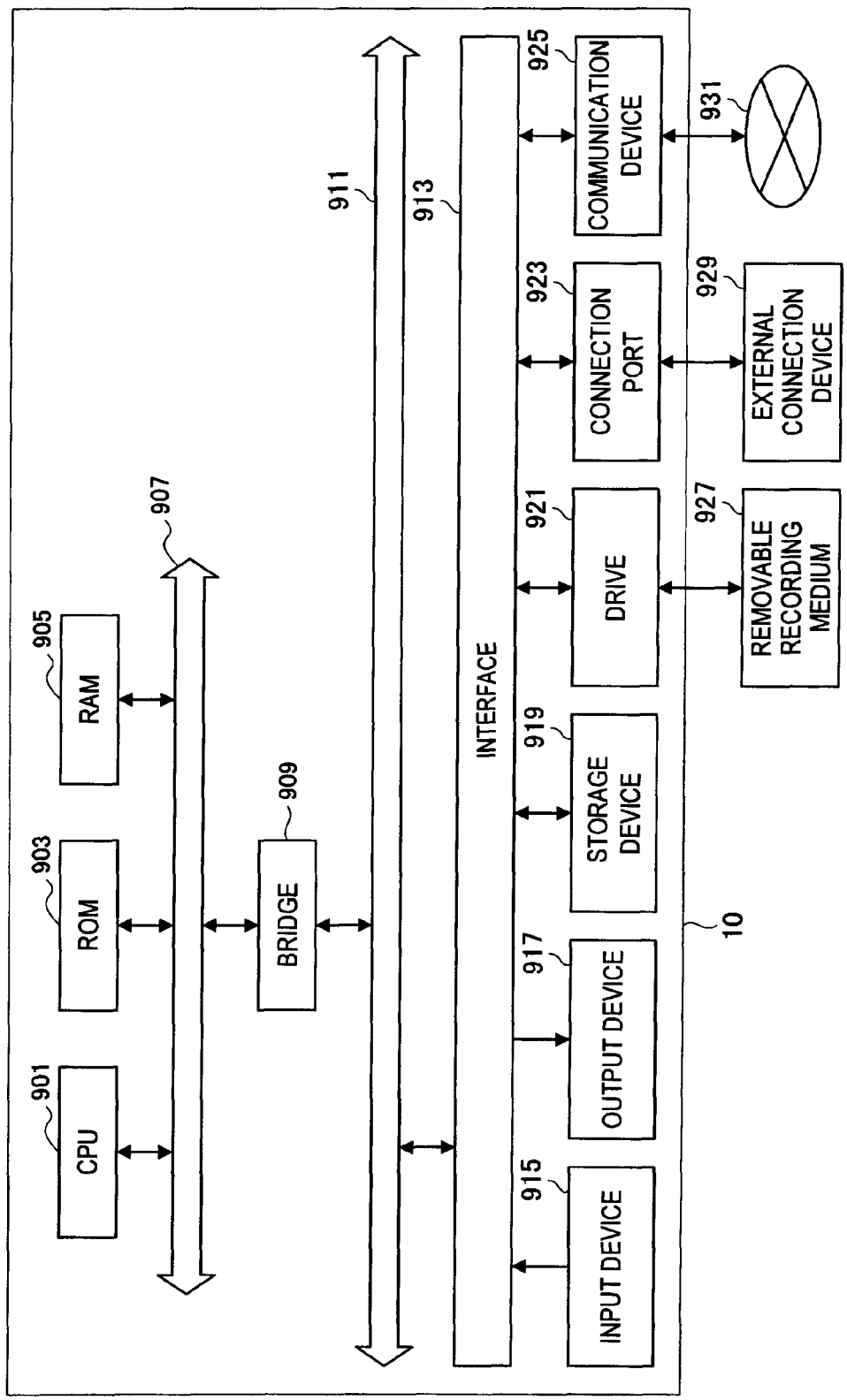
FIG. 17 is a block diagram illustrating a hardware structure of an image processing apparatus according to each of embodiments of the present invention.

Referring to FIG. 17, a hardware structure of an image processing apparatus according to each of the embodiments of the present invention will be described in detail. FIG. 17 is a block diagram illustrating the hardware structure of the image processing apparatus according to each of the embodiments of the present invention.

The image processing apparatus 10 mainly includes CPU 901, ROM 903, RAM 905, a host bus 907, a bridge 909, an external bus 911, an interface 913, an input device 915, an output device 917, a storage device 919, a drive 921, a connection port 923, and a communication device 925.

CPU 901 serves as a computing device and a controller for controlling all or a part of operations in the image processing apparatus 10 in accordance with various programs recorded in ROM 903, RAM 905, the storage device 919 or a removable recording medium 927. ROM 903 stores programs, operational parameters, and so on used by CPU 901. RAM 905 temporarily stores a program for use in execution by CPU 901, parameters that changes appropriately in the execution of the program, and so on. CPU, ROM, and RAM are connected with each other via the host bus 907 formed by an internal bus, such as a CPU bus.

The host bus 907 is connected to the external bus 911, such as a Peripheral Component Interconnect/Interface (PCI) bus via the bridge 909.

The input device 915 is an operation means, such as mouse, a keyboard, a touch panel, a button, a switch, a lever, and so on, which is operated by a user. In addition, the input device 915 may be a remote control means (what is called remote controller) using infrared ray or other radio waves, or may be an external connection device 929, such as a mobile telephone and PDA, adapted to the operation of the image processing apparatus 10. In addition, the input device 915 includes, for example, an input control circuit for generating an input signal based on information input by the user using the above-mentioned operation means and outputting the input signal to CPU 901. The user of the image processing apparatus 10 can input various data and instruct a processing operation to the image processing apparatus 10 by operating the input device 915.

The output device 917 includes, for example, a display device, such as a CRT display device, a liquid crystal display device, a plasma display device, an EL display device and a lamp, an audio output device, such as a speaker and head phones, a printer, a mobile telephone, a facsimile machine, and so on, which are capable of visually or audibly communicating acquired information to the user. The output device 917 outputs, for example, a result acquired from various processing functions performed by the image processing apparatus 10. In particular, on one hand, the display device displays the result acquired from the various processing functions performed by the image processing apparatus 10 in the form of text or image. On the other hand, the audio output device transforms an audio signal including reproduced audio data, acoustic data, or the like into an analog signal, and outputs the analog signal.

The storage device 919 is a data storing device, which is configured as an example of a storage unit of the image processing apparatus 10, and includes, for example, a magnetic storage device, such as a hard disk drive (HDD), a semiconductor storage device, an optical storage device, a magnetic optical storage device, or the like. The storage device 919 stores a wide variety of data, such as programs executed by CPU 901, various data, and image signal data acquired from an outside.

The drive 921 is a reader/writer for a recording medium and may be embedded in or attached externally to the image processing apparatus 10. The drive 921 reads out information recorded in the removable recording medium 927, such as an attached magnetic disk, optical disk, magnetic optical disk, or semiconductor memory, and outputs the information to RAM 905. In addition, the drive 921 is capable of writing recordings to the removable recording medium 927, such as the attached magnetic disk, optical disk, magnetic optical disk, or semiconductor memory. The removable recording medium 927 may be, for example, a DVD medium, a HD-DVD medium, a Blu-ray medium, CompactFlash (CF) (registered mark), a memory stick, a Secure Digital (SD) memory card, or the like. In addition, the removable recording medium 927 may be, for example, in a form of an Integrated Circuit (IC) card equipped with a non-contact IC chip, an electronic device, or the like.

The connection port 923 is a port, such as an Universal Serial Bus (USB) port, an IEEE 1394 port including an i.LINK port, a Small Computer System Interface (SCSI) port, a RS-232C port, an optical audio terminal, an High-Definition Multimedia Interface (HDMI) port, or the like, which is used to directly connect an equipment to the image processing apparatus 10. By connecting the external connection device 929 to this connection port 923, the image processing apparatus 10 acquires image signal data or the like directly from the external connection device 929 or provide image signal data or the like to the external connection device 929.

The communication device 925 is a communication interface, which includes, for example, a communication device portion for connecting to a communication network 931. The communication device 925 is made in a form of a communication card for use in wired or wireless Local Area Network (LAN), Bluetooth, or Wireless USB (WUSB), a router for use in optical communication, a router for use in Asymmetric Digital Subscriber Line (ADSL), a modem for use in various communication environments, or the like. For example, this communication device 925 is capable of sending/receiving signals and so on in conformity with a predetermined protocol, such as TCP/IP, to/from Internet and other communication equipments. The communication network 931 connected to the communication device 925 is formed by networks and so on connected via wired or wireless connection, and may be configured as, for example, Internet, home LAN, infrared communication, radio communication, satellite communication, or the like.

An example of a possible hardware structure for implementing features of the image processing apparatus 10 according to each of the embodiments of the present invention has been described above. Each of above components may be configured using a general purpose member, or may be configured with a dedicated hardware for a feature of each component. Thus, the hardware structure used can be appropriately modified depending on the technological level at the time of implementing this embodiment.

It is noted that it is possible to create a computer program for implementing various features of an image processing apparatus according to each of the embodiments of the present invention as described above, and install the computer program on a personal computer and so on.

<Summary>

As described above, in an image processing apparatus and an image processing method according to each of the embodiments of the present invention, an execution parameter in performing an image processing function can be set depending on a size of a contact surface area between an operator and a processing result display area and its contact duration. Therefore, a user can view a processing result corresponding to a modified execution parameter without knowing the meaning of the execution parameter. This allows, in the image processing apparatus and the image processing method according to each of the embodiments of the present invention, a parameter required for an image processing function to be easily set without impairing convenience for a user.

In addition, since it is possible to display a processing result, which has been acquired by performing an image processing function, in a processing result display area as an exemplary image, a user can be presented with what kind of an image processing function is to be performed. As a result, the user can intuitively perceive an effect of the image processing function to be performed. Moreover, since the user can perform the image processing function by dragging and dropping a process target image onto the processing result display area, the user can intuitively perceive an operation method of the image processing apparatus. Furthermore, since it is sufficient for the user only to pay attention to the process target image and the processing result display area, and it is not necessary for the user to search for tool bars and so on, switching from one image processing function to another image processing function can be achieved in a short period of time.

It should be understood by those skilled in the art that various modifications, combinations, sub-combinations and alterations may occur depending on design requirements and other factors insofar as they are within the scope of the appended claims or the equivalents thereof.

For example, in the above-mentioned embodiment, it has been described that an execution parameter is to be set depending on a size of a contact surface area and a length of its contact duration, but the execution parameter may be set depending on a number of tap operations in which an operator taps a touch panel.

In addition, although still image data has been focused on in the above-mentioned embodiment, the present invention is applicable to moving image data.

The present application contains subject matter related to that disclosed in Japanese Priority Patent Application JP 2008-271087 filed in the Japan Patent Office on Oct. 21, 2008, the entire content of which is hereby incorporated by reference.

What is claimed is:

1. An image processing apparatus comprising:
a display screen having processing result display areas in which an image processing result acquired by performing a predetermined image processing function on a specified image data is displayed;
a surface area detection unit for detecting an operator located on the display screen and detecting a surface area corresponding to the operator on the display screen;
a contact detection unit for detecting one or more of the processing result display areas in contact with the surface area detected by the surface area detection unit;
an image processing unit for performing an image processing function by changing an execution parameter for the image processing function related to the processing result display area detected by the contact detection unit depending on at least one of a size of the surface area in contact with the detected processing result display area and a length of contact duration in which the operator contacts the detected processing result display area, wherein execution examples acquired by performing an image processing function related to the processing result display area have previously been displayed as exemplary images in the processing result display areas; and the image processing unit performs an image processing function related to a processing result display area on the image data that has been moved to a predetermined area by the operator.

2. The image processing apparatus according to claim 1, wherein
the image processing unit changes and displays the exemplary images that have been acquired by applying the image processing function using the execution parameter with different values being set at a predetermined time interval.

3. The image processing apparatus according to claim 1, wherein
the image processing unit performs an image processing function on the image data that has been overlapped with the exemplary images by the operator.

4. An image processing apparatus comprising:
a display screen having processing result display areas in which an image processing result acquired by performing a predetermined image processing function on a specified image data is displayed;
a surface area detection unit for detecting an operator located on the display screen and detecting a surface area corresponding to the operator on the display screen;
a contact detection unit for detecting one or more of the processing result display areas in contact with the surface area detected by the surface area detection unit;
an image processing unit for performing an image processing function by changing an execution parameter for the image processing function related to the processing result display area detected by the contact detection unit depending on at least one of a size of the surface area in contact with the detected processing result display area and a length of contact duration in which the operator contacts the detected processing result display area, wherein the processing result display area has a predetermined shape; and the image processing unit changes a shape of the image data that has been overlapped with the processing result display area by the operator into the shape of the processing result display area.

5. An image processing method comprising the steps of:
detecting an operator located on a display screen having processing result display areas in which an image processing result acquired by performing a predetermined image processing function on a specified image data is displayed, and detecting a surface area corresponding to the operator on the display screen;
detecting one or more of the processing result display areas in contact with the detected surface area; and
performing an image processing function by changing an execution parameter for the image processing function related to the detected processing result display area depending on at least one of a size of the surface area in contact with the detected processing result display area and a length of contact duration in which the operator contacts the detected processing result display area, wherein execution examples acquired by performing an image processing function related to the processing result display area have previously been displayed as exemplary images in the processing result display areas; and performing an image processing function relates to a processing result display area on the image data that has been moved to a predetermined area by the operator.

6. A non-transitory computer-readable medium comprising instructions for causing a computer including a display screen having processing result display areas in which an image processing result acquired by performing a predetermined image processing function on a specified image data is displayed to execute:

a surface area detection process for detecting an operator located on the display screen and detecting a surface area corresponding to the operator on the display screen;

a contact detection process for detecting one or more of the processing result display areas in contact with the surface area detected by the surface area detection process; and an image processing process for performing an image processing function by changing an execution parameter for the image processing function related to the processing result display area detected by the contact detection process depending on at least one of a size of the surface area in contact with the detected processing result display area and a length of contact duration in which the operator contacts the detected processing result display area, wherein the processing result display area has a predetermined shape; and the image processing process comprises changing a shape of the image data that has been overlapped with the processing result display area by the operator into the shape of the processing result display area.

* * * * *